US010680761B2

(12) United States Patent
Yang et al.

(10) Patent No.: US 10,680,761 B2
(45) Date of Patent: Jun. 9, 2020

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Byounghoon Kim, Seoul (KR); Kijun Kim, Seoul (KR); Joonkui Ahn, Seoul (KR); Changhwan Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/532,090

(22) Filed: Aug. 5, 2019

(65) Prior Publication Data

US 2019/0363832 A1 Nov. 28, 2019

Related U.S. Application Data

(63) Continuation of application No. PCT/KR2018/001515, filed on Feb. 5, 2018.

(60) Provisional application No. 62/593,273, filed on Dec. 1, 2017, provisional application No. 62/586,876, filed on Nov. 15, 2017, provisional application No. 62/566,338, filed on Sep. 30, 2017, provisional (Continued)

(51) Int. Cl.
*H04W 72/04* (2009.01)
*H04L 1/18* (2006.01)

(52) U.S. Cl.
CPC ............ *H04L 1/18* (2013.01); *H04W 72/0446* (2013.01)

(58) Field of Classification Search
CPC ............ H04W 72/0446; H04W 60/06; H04W 52/0212; H04L 1/18
See application file for complete search history.

(56) References Cited

U.S. PATENT DOCUMENTS

2011/0244800 A1* 10/2011 Bogestam ............ G06Q 30/02
455/41.2
2013/0165118 A1* 6/2013 Moses .................. H04W 60/00
455/435.1

(Continued)

FOREIGN PATENT DOCUMENTS

KR 1020160105832 9/2016

OTHER PUBLICATIONS

InterDigital Communications, "Impact of Supporting Different Numerologies," R1-1700708, 3GPP TSG-RAN WG1 AH_NR Meeting, Spokane, USA, Jan. 16-20, 2017, 4 pages.
Ericsson, "HARQ process handling with different TTIs lengths," R2-1701607, 3GPP TSG-RAN WG2 #97, Feb. 13-17, 2017, 4 pages.

(Continued)

Primary Examiner — Wei Zhao
(74) Attorney, Agent, or Firm — Fish & Richardson P.C.

(57) ABSTRACT

The present invention relates to a wireless communication system and, more particularly, to a method and an apparatus therefor, the method comprising the steps of: identifying a minimum storing area per data in a HARQ buffer on the basis of a TTI length; storing data for transmission of a wireless signal in the HARQ buffer on the basis of the minimum storing area per data; and transmitting the data in the HARQ buffer during a first TTI, wherein, when the data is retransmitted data, the minimum storing area per data is based on the length of a second TTI used for initial transmission of the data, and the length of the second TTI is different from the length of the first TTI.

16 Claims, 17 Drawing Sheets

Related U.S. Application Data application No. 62/555,705, filed on Sep. 8, 2017, provisional application No. 62/525,172, filed on Jun. 26, 2017, provisional application No. 62/520,563, filed on Jun. 16, 2017, provisional application No. 62/501,052, filed on May 3, 2017, provisional application No. 62/481,043, filed on Apr. 3, 2017, provisional application No. 62/469,548, filed on Mar. 10, 2017, provisional application No. 62/454,893, filed on Feb. 5, 2017.

(56) References Cited

U.S. PATENT DOCUMENTS

| | | | |
|---|---|---|---|
| 2015/0312371 A1* | 10/2015 | Han | ........................ H04W 4/70 370/281 |
| 2016/0174216 A1 | 6/2016 | Jain et al. | |

OTHER PUBLICATIONS

NTT DoCoMo, "On URLLC scheduling and HARQ mechanism," R1-1612713, 3GPP TSG RAN WG1 Meeting #87, Reno USA, Nov. 14-18, 2016, 9 pages.
NTT DoCoMo, Inc., "Scheduling and HARQ aspects for NR," R1-1612719, 3GPP TSG RAN WG1 Meeting #87, Reno, USA, Nov. 14-18, 2016, 6 pages.
PCT International Search Report and Written Opinion in International Application No. PCT/KR2018/001515, dated May 28, 2018, 21 pages (with English translation).
LG Electronics, "SLS results on coexistence between eMBB and URLLC," R1-1700515, 3GPP TSG RAN WG1 NR Ad-Hoc Meeting, Spokane, USA, Jan. 16-20, 2017, 7 pages.
NTT DoCoMo, INC., "HARQ and scheduling operation for NR," R1-1610084, 3GPP TSG RAN WG1 Meeting #86bis, Lisbon, Portugal, Oct. 10-14, 2016, 8 pages.
Qualcomm, "Considerations on ECP use cases with 60 kHz SCS," R1-1700843, 3GPP TSG-RAN WG1 NR Ad-Hoc, Spokane, Washington, USA, Jan. 16-20, 2017, 5 pages.

* cited by examiner

HARQ processes in UL-DL configuration #1

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application is a continuation of International Application No. PCT/KR2018/001515, filed on Feb. 5, 2018, which claims the benefit of U.S. Provisional Application No. 62/593,273, filed on Dec. 1, 2017, U.S. Provisional Application No. 62/586,876, filed on Nov. 15, 2017, U.S. Provisional Application No. 62/566,338, filed on Sep. 30, 2017, U.S. Provisional Application No. 62/555,705, filed on Sep. 8, 2017, U.S. Provisional Application No. 62/525,172, filed on Jun. 26, 2017, U.S. Provisional Application No. 62/520,563, filed on Jun. 16, 2017, U.S. Provisional Application No. 62/501,052, filed on May 3, 2017, U.S. Provisional Application No. 62/481,043, filed on Apr. 3, 2017, U.S. Provisional Application No. 62/469,548, filed on Mar. 10, 2017, and U.S. Provisional Application No. 62/454,893, filed on Feb. 5, 2017. The disclosures of the prior applications are incorporated by reference in their entirety.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

It is an object of the present invention to provide a method and apparatus for efficiently performing operations of transmission and reception of a wireless signal.

Technical tasks obtainable from the present invention are not limited by the above-mentioned technical task. And, other unmentioned technical tasks can be clearly understood from the following description by those having ordinary skill in the technical field to which the present invention pertains.

Technical Solution

In one aspect of the present invention, provided herein is a method for transmitting a wireless signal by a communication device in a wireless communication system, the method including checking a minimum storage space per data in a Hybrid Automatic Repeat and reQuest (Hybrid ARQ, HARQ) buffer based on a transmission time interval (TTI) length, storing data for transmission of the wireless signal in the HARQ buffer based on the minimum storage space per data, and transmitting the data in the HARQ buffer for a first TTI, wherein, when the data is retransmitted data, the minimum storage space per data is based on a length of a second TTI used for initial transmission of the data, the length of the second TTI being different from a length of the first TTI.

In another aspect of the present invention, provided herein is a communication device used in a wireless communication system, including an radio frequency (RF) module, and a processor, wherein the processor is configured to check a minimum storage space per data in a Hybrid ARQ (HARQ) buffer based on a transmission time interval (TTI) length, store data for transmission of the wireless signal in the HARQ buffer based on the minimum storage space per data, and transmit the data in the HARQ buffer for a first TTI, wherein, when the data is retransmitted data, the minimum storage space per data is based on a length of a second TTI used for initial transmission of the data, the length of the second TTI being different from a length of the first TTI.

The checking of the minimum storage space per data may be performed by dividing an entire space of the HARQ buffer by the number of HARQ processes corresponding to the TTI length.

The checking of the minimum storage space per data may be performed by dividing an entire space of the HARQ buffer into a plurality of sub-HARQ buffers according to the number of TTI lengths and then dividing each of the sub-HARQ buffers by the number of HARQ processes corresponding to a corresponding TTI length.

When the length of the first TTI is greater than the length of the second TTI, the minimum storage space per data based on the length of the first TTI may be checked by dividing an entire space of the HARQ buffer by the number of HARQ processes corresponding to the length of the first TTI, and the minimum storage space per data based on the length of the second TTI may be checked by dividing a partial space of the HARQ buffer by the number of HARQ processes corresponding to the length of the second TTI.

The communication device may have a plurality of component carrier (CCs) for different radio access technologies (RATs) aggregated, and a size of the HARQ buffer may be determined by the following equations according to the RATs used for transmission of the wireless signal:

$$\text{Buffer size for RAT1:} S*A*(N1/N); \text{ and}$$

$$\text{Buffer size for RAT2:} S*B*(N2/N).$$

Herein, S denotes a total size of the HARQ buffer in the communication device, A and B denote coefficients indicative of a ratio of the buffer sizes for RAT1 and RAT2, N1 denotes the number of CCs configured for RAT1, N2 denotes the number of CCs configured for RAT2, and N denotes a sum of N1 and N2.

A size of the TTI length may be given in the following order according to a service type: Ultra-Reliable and Low Latency Communications (URLLC)<enhanced Mobile Broadband (eMBB)<massive Machine Type Communications (mMTC).

The wireless communication system may include a Third Generation Project Partnership Long Term Evolution (3GPP LTE)-based wireless communication system, wherein the TTI length may be a multiple of a subframe or slot.

Advantageous Effects

According to embodiments of the present invention, wireless signal transmission and reception can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of the specification, illustrate embodiments of the invention and, together with the description, serve to explain the principles of the invention.

BEST MODE

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, and LTE-Advanced (LTE-A) is a evolved version of 3GPP LTE. While the following description is given, centering on 3GPP LTE/LTE-A for clarity, this is purely exemplary and thus should not be construed as limiting the present invention.

In a wireless communication system, a UE receives information from a base station (BS) through downlink (DL), and transmits information to the BS through uplink (UL). The information transmitted and received by the BS and the UE includes data and various kinds of control information, and there are various physical channels according to the types/uses of the information transmitted/received by the BS and the UE.

Figure 1:
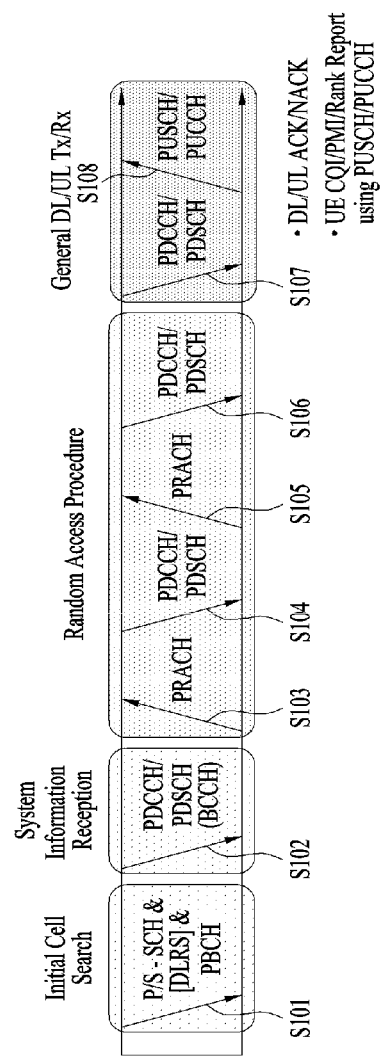
FIG. 1 illustrates physical channels used in a 3GPP LTE(-A) system, which is an example of a wireless communication system, and a typical signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
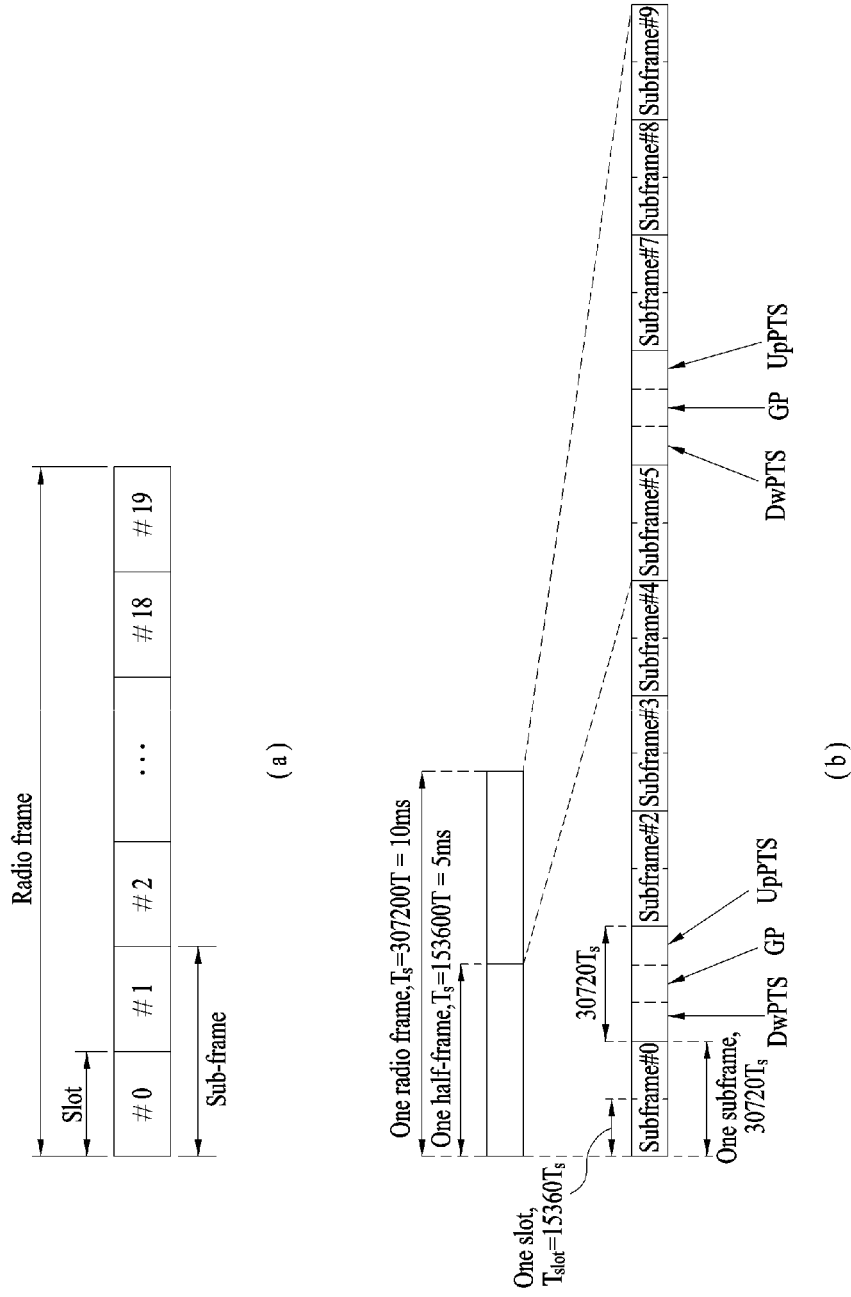
FIG. 2 illustrates a radio frame structure.

FIG. 2 illustrates a radio frame structure. Uplink/downlink data packet transmission is performed on a subframeby-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
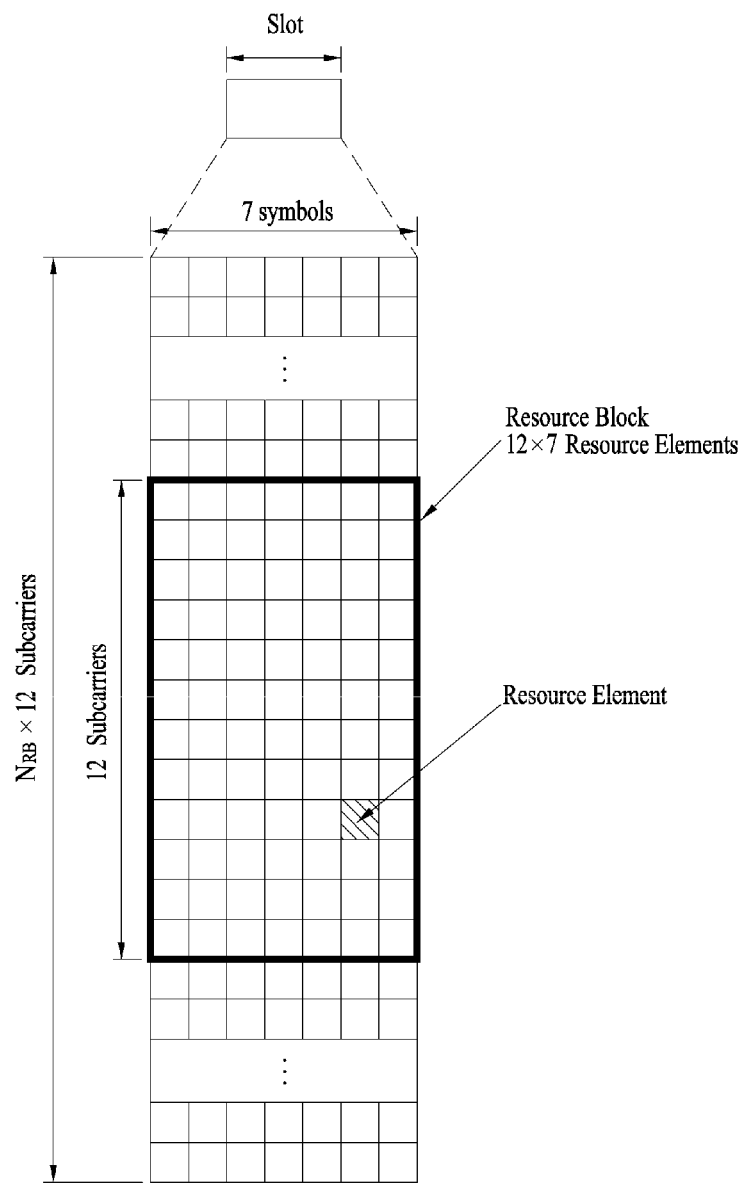
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
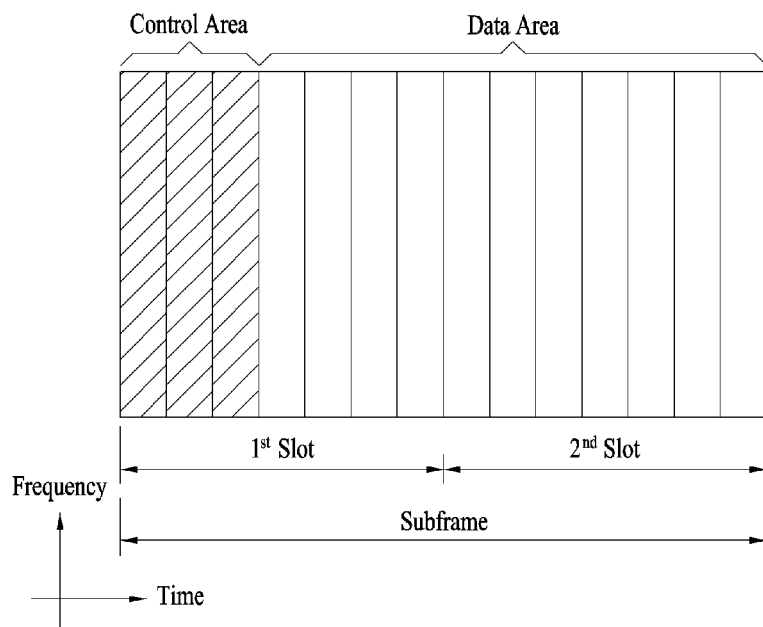
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)
  Transmission mode 1: Transmission from a single base station antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO (Multiple Input Multiple Output)
  Transmission mode 6: Closed-loop rank-1 precoding
  Transmission mode 7: Single-antenna port (port 5) transmission
  Transmission mode 8: Double layer transmission (ports 7 and 8) or single-antenna port (port 7 or 8) transmission
  Transmission mode 9: Transmission through up to 8 layers (ports 7 to 14) or single-antenna port (port 7 or 8) transmission
DCI Format
  Format 0: Resource grants for PUSCH transmission
  Format 1: Resource assignments for single codeword PDSCH transmission (transmission modes 1, 2 and 7)
  Format 1A: Compact signaling of resource assignments for single codeword PDSCH (all modes)
  Format 1B: Compact resource assignments for PDSCH using rank-1 closed loop precoding (mod 6)
  Format 1C: Very compact resource assignments for PDSCH (e.g. paging/broadcast system information)

Format 1D: Compact resource assignments for PDSCH using multi-user MIMO (mode 5)

Format 2: Resource assignments for PDSCH for closed-loop MIMO operation (mode 4)

Format 2A: Resource assignments for PDSCH for open-loop MIMO operation (mode 3)

Figure 5:
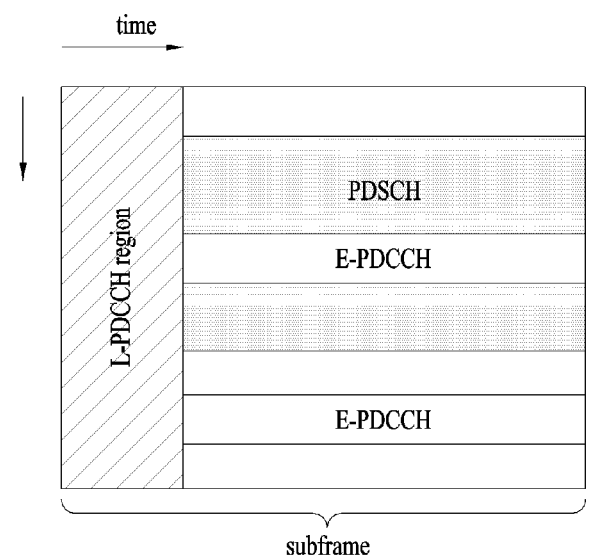
FIG. 5 illustrates an example of Enhanced Physical Downlink Control Channel (EPDCCH).

Format 3/3A: Power control commands for PUCCH and PUSCH with 2-bit/i-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
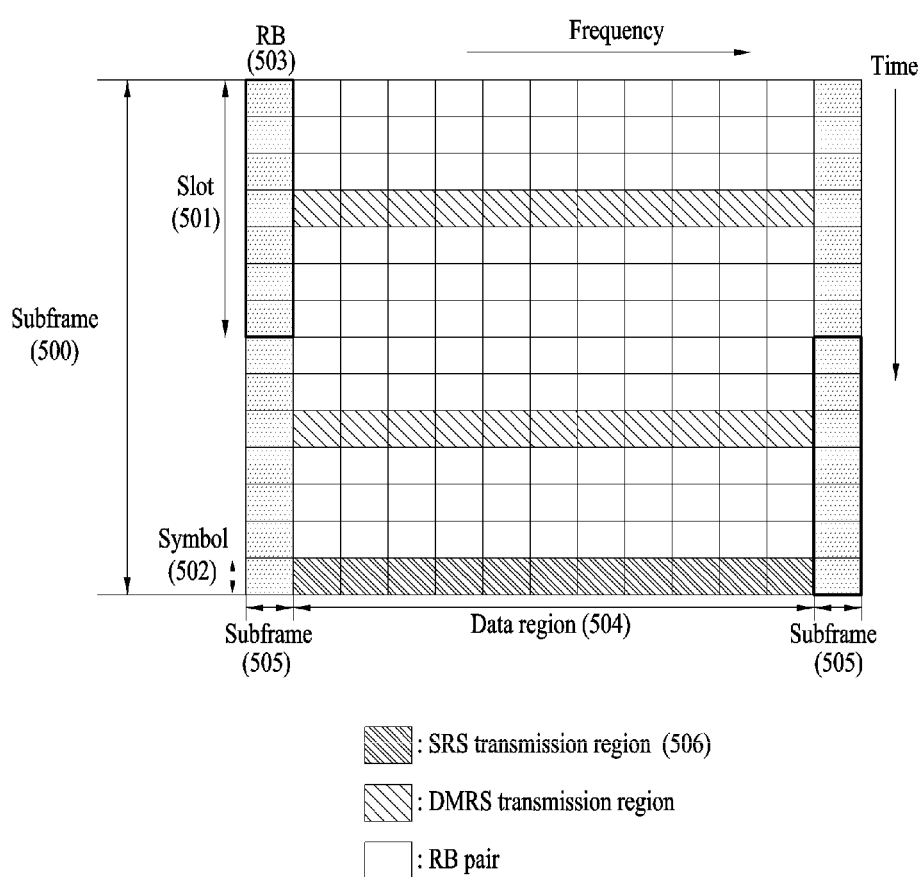
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Next, HARQ (Hybrid Automatic Repeat reQuest) will be described. When there are a plurality of UEs having data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignment message is also referred to as a UL grant. The UEs transmit data on uplink according to the UL assignment message. The UL assignment message may include UE identity (ID), RB allocatioin information, a modulation and coding scheme (MCS), a redundancy version (RV), new data indication (NDI) and the like.

In the case of synchronous HARQ, a retransmission time is appointed in the system (e.g., after 4 subframes from a NACK reception time) (synchronous HARQ). Accordingly, the eNB may send a UL grant message to UEs only in initial transmission and subsequent retransmission is performed according to an ACK/NACK signal (e.g., PHICH signal). In the case of asynchronous HARQ, a retransmission time is not appointed and thus the eNB needs to send a retransmission request message to UEs. Further, frequency resources or an MCS for retransmission are identical to those in previous transmission in the case of non-adaptive HARQ, whereas frequency resources or an MCS for retransmission may differ from those in previous transmission in the case of adaptive HARQ. For example, in the case of asynchronous adaptive HARQ, the retransmission request message may include UE ID, RB allocation information, HARQ process ID/number, RV and NDI information because frequency resources or an MCS for retransmission vary with transmission time.

Figure 7:
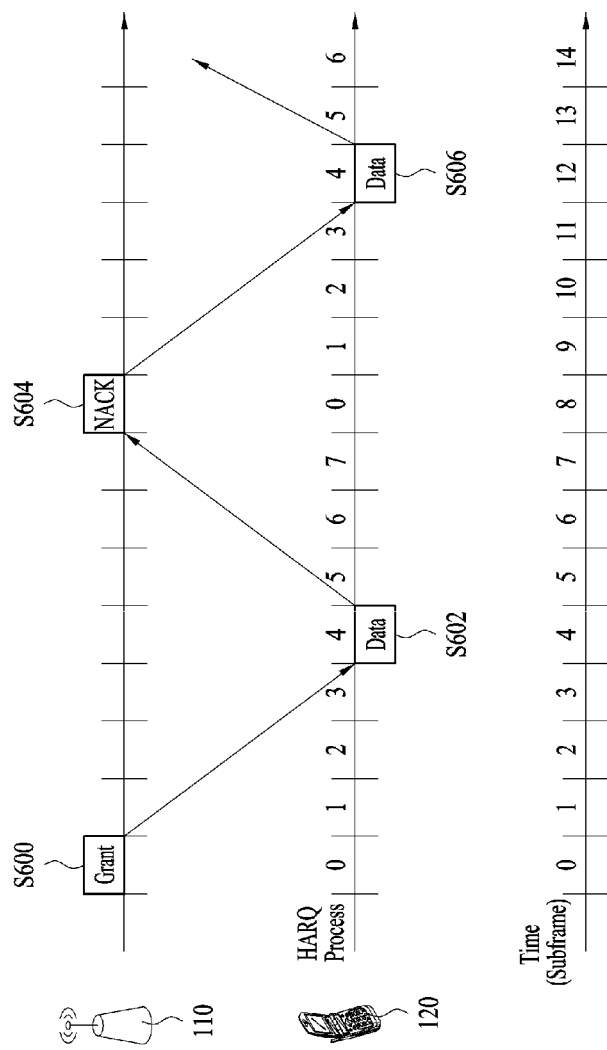
FIG. 7 illustrates UL HARQ (Uplink Hybrid Automatic Repeat reQuest) operation.

FIG. 7 illustrates a UL HARQ operation in an LTE(-A) system. In the LTE(-A) system, asynchronous adaptive HARQ is used as UL HARQ. When 8-channel HARQ is used, 0 to 7 are provided as HARQ process numbers. One HARQ process operates per TTI (e.g., subframe). Referring to FIG. 7, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

A description will be given of TDD signal transmission timing in a single carrier (or cell) situation with reference to FIGS. 8 to 14.

Figure 8:
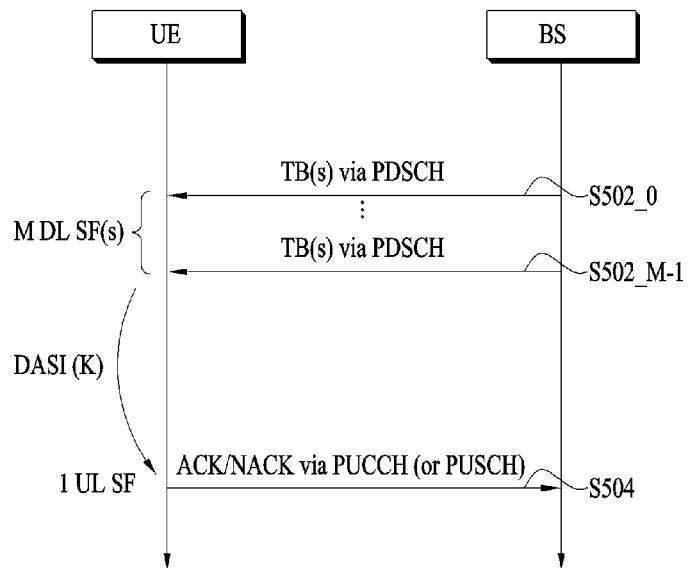
FIGS. 8 and 9 illustrate TDD UL ACK/NACK (Uplink Acknowledgement/Negative Acknowledgement) transmission timing in a single cell case.
Figure 9:
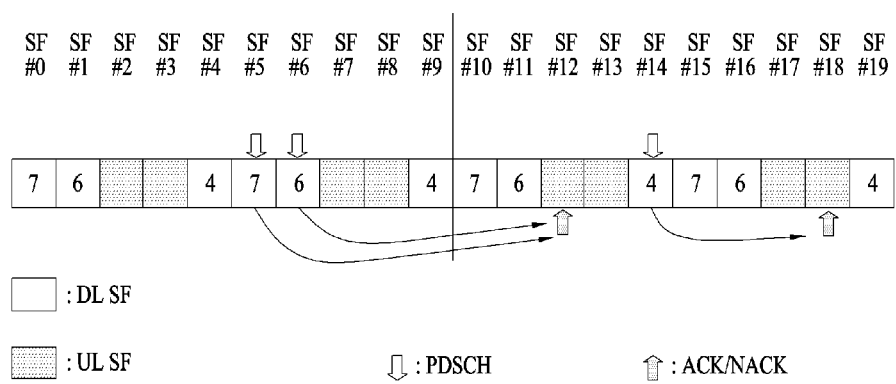

FIGS. 8 and 9 illustrate PDSCH-UL ACK/NACK timing. Here, UL ACK/NACK refers to ACK/NACK transmitted on uplink in response to DL data (e.g., PDSCH).

Referring to FIG. 8, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: {k0, k1, . . . , k−1}) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n-k (k∈K), the UE transmits ACK/NACK in a subframe n.

TABLE 4

| TDD UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 9 illustrates UL ACK/NACK transmission timing when UL-DL configuration #1 is configured. In the figure, SF #0 to #9 and SF #10 to #19 respectively correspond to radio frames, and numerals in blocks denote UL subframes relating to DL subframes. For example, ACK/NACK for a PDSCH of SF #5 is transmitted in SF #5+7 (=SF #12) and ACK/NACK for a PDSCH of SF #6 is transmitted in SF #6+6 (=SF #12). Accordingly, both ACKs/NACKs for DL signals of SF #5/#6 are transmitted in SF #12. Similarly, ACK/NACK for a PDSCH of SF #14 is transmitted in SF #14+4 (=SF #18).

Figure 10:
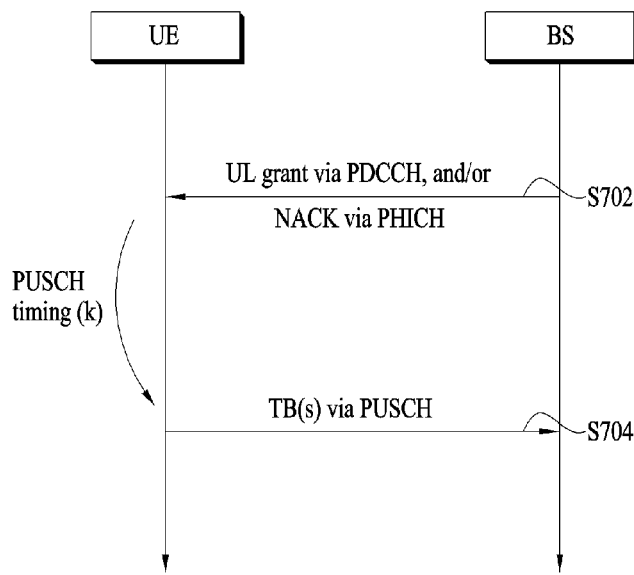
FIGS. 10 and 11 illustrate TDD PUSCH (Physical Uplink Shared Channel) transmission timing in a single cell case.
Figure 11:
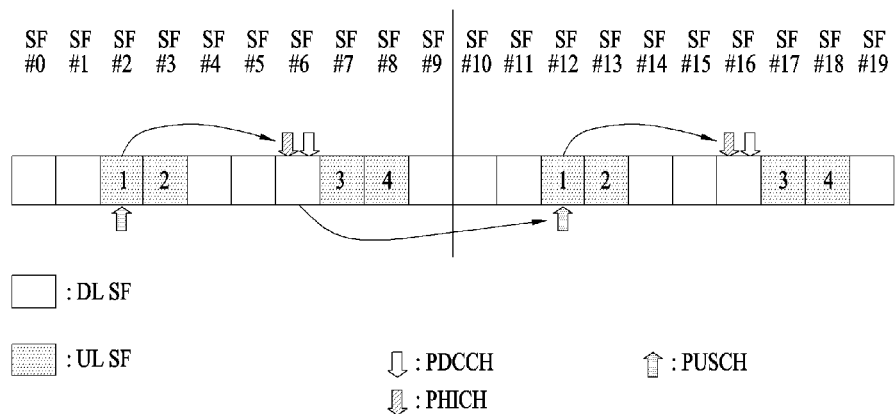

FIGS. 10 and 11 illustrate PHICH grant-PUSCH timing. A PUSCH can be transmitted corresponding to a PDCCH (UL grant) and/or a PHICH (NACK).

Referring to FIG. 10, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 6 | | | | 4 | 6 | |
| 1 | | | 6 | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 11 illustrates PUSCH transmission timing when UL-DL configuration #1 is configured. In the figure, SF #0 to #9 and SF #10 to #19 respectively correspond to radio frames, and numerals in blocks denote UL subframes relating to DL subframes. For example, a PUSCH corresponding to PHICH/UL grant of SF #6 is transmitted in SF #6+6 (=SF #12) and a PUSCH corresponding to a PHICH/UL grant of SF #14 is transmitted in SF #14+4 (=SF #18).

Figure 12:
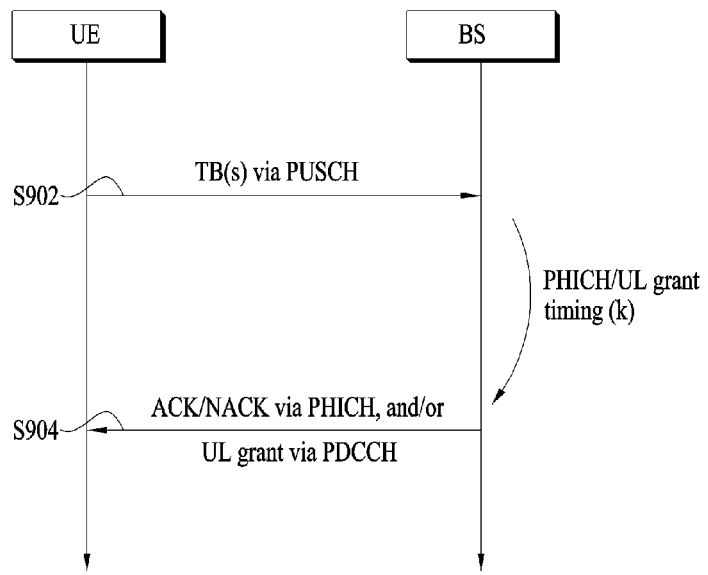
FIGS. 12 and 13 illustrate TDD DL ACK/NACK transmission timing in a single cell case.
Figure 13:
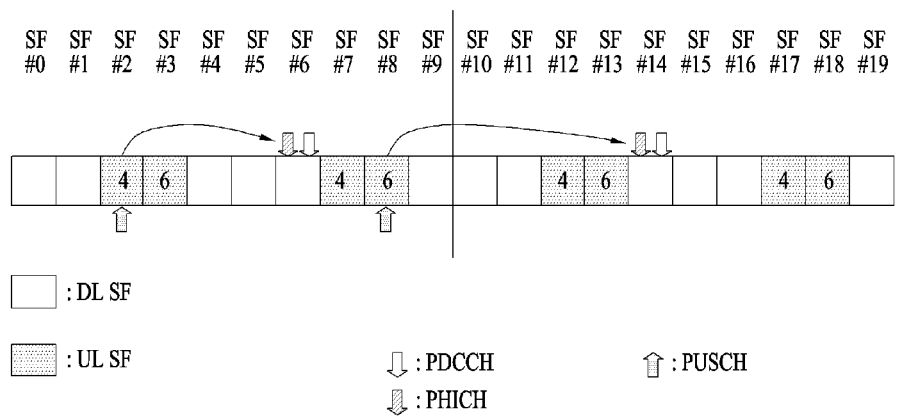

FIGS. 12 and 13 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 12, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i-k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | | 7 | 4 | | | | 7 | 4 | |
| 1 | | | 4 | | | 6 | | | 4 | 6 |
| 2 | | | | | 6 | | | | 6 | |
| 3 | | 6 | | | | | | | 6 | 6 |
| 4 | | | | | | | | | 6 | 6 |
| 5 | | | | | | | | | 6 | |
| 6 | | 6 | 4 | | | | 7 | 4 | | 6 |

FIG. 13 illustrates PHICH/UL grant transmission timing when UL-DL configuration #1 is configured. In the figure, SF #0 to #9 and SF #10 to #19 respectively correspond to radio frames, and numerals in blocks denote DL subframes relating to UL subframes. For example, a PHICH/UL grant corresponding to a PUSCH of SF #2 is transmitted in SF #2+4 (=SF #6) and a PHICH/UL grant corresponding to a PUSCH of SF #8 is transmitted in SF #8+6 (=SF #14).

PHICH resource allocation will now be described. When a PUSCH is transmitted in subframe # n, the UE determines a PHICH resource corresponding to the PUSCH in subframe #(n+kPHICH). In case of FDD, kPHICH has a fixed value (e.g. 4). In case of TDD, kPHICH has a value depending on UL-DL configuration. Table 7 shows kPHICH for TDD is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | | 4 | 7 | 6 | | | 4 | 7 | 6 |
| 1 | | | | 4 | 6 | | | | 4 | 6 | |
| 2 | | | | 6 | | | | | 6 | | |
| 3 | | | | 6 | 6 | 6 | | | | | |
| 4 | | | | 6 | 6 | | | | | | |
| 5 | | | | 6 | | | | | | | |
| 6 | | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are configured differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time.

The number of UL HARQ processes varies. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the number of synchronous UL HARQ processes and HARQ RTT in TDD. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=>SF #13: PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 8

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

Figure 14:
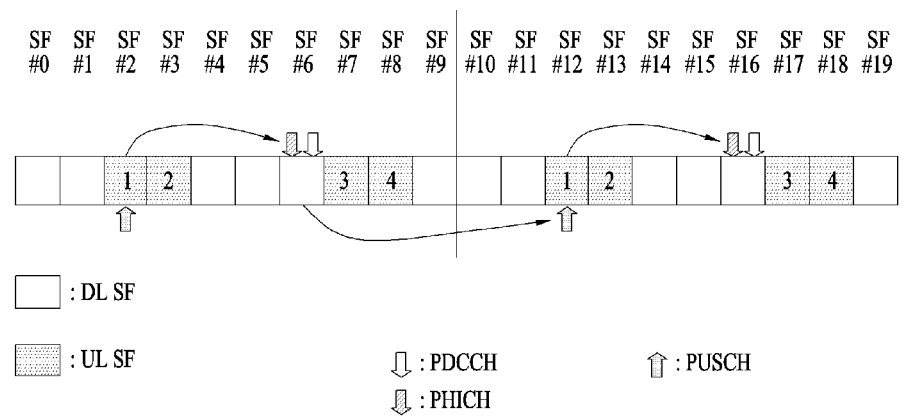
FIG. 14 illustrates a TDD HARQ (Hybrid Automatic Repeat request) process in a single cell situation.

FIG. 14 illustrates a synchronous UL HARQ process when UL-DL configuration #1 is configured. Numerals in blocks denote UL HARQ process numbers. The synchronous UL HARQ process shown in FIG. 14 corresponds to a normal HARQ process. Referring to FIG. 14, HARQ process #1 involves SF #2, SF #6, SF #12 and SF #16. For example, if an initial PUSCH signal (e.g. RV=0) is transmitted in SF #2, a UL grant PDCCH and/or a PHICH corresponding to the PUSCH signal can be received in SF #6 and a (retransmission) PUSCH signal (e.g. RV=2) corresponding to the initial PUSCH signal can be transmitted in SF #12. Accordingly, 4 UL HARQ processes having an RTT (Round Trip Time) of 10 SFs (or 10 ms) are present in case of UL-DL configuration #1.

Figure 15:
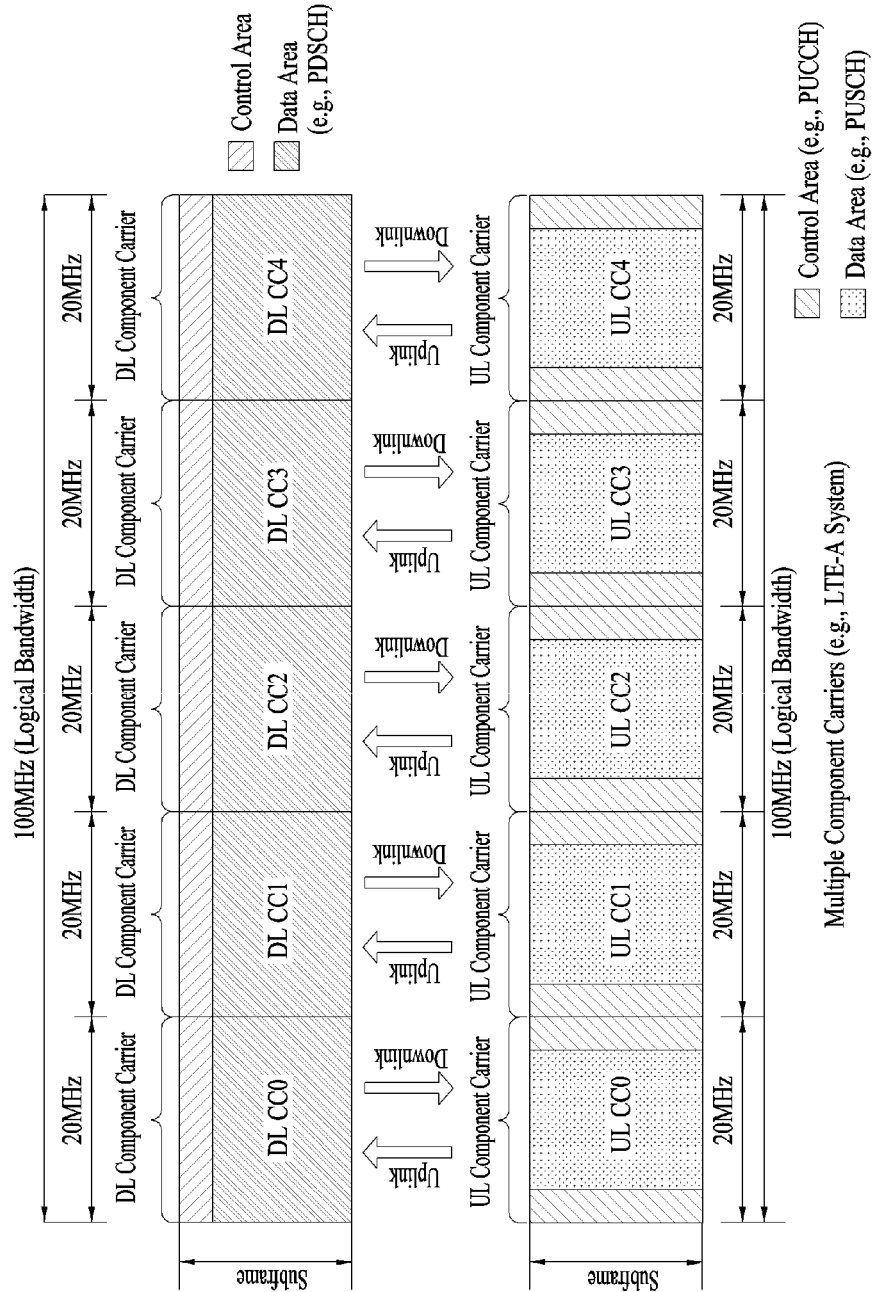
FIG. 15 illustrates a carrier aggregation (CA)-based wireless communication system.

FIG. 15 illustrates carrier aggregation (CA) communication system.

Referring to FIG. 15, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
    No CIF
  CIF enabled: a PDCCH on a DL CC can be used to allocate a PDSCH or PUSCH resource on a specific DL/UL CC from among a plurality of aggregated DL/UL CCs using the CIF.
    LTE DCI format extended to have CIF
    CIF corresponds to a fixed x-bit field (e.g. x=3) (when CIF is set)
    CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 16:
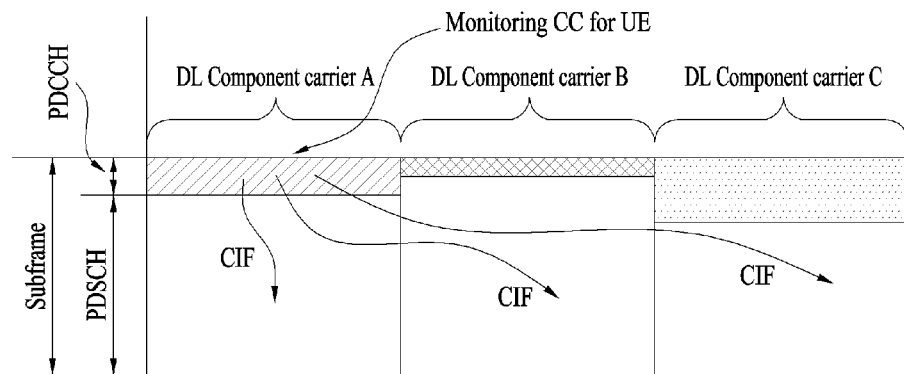
FIG. 16 illustrates cross-carrier scheduling.

FIG. 16 illustrates scheduling when a plurality of carriers is aggregated. It is assumed that 3 DL CCs are aggregated and DL CC A is set to a PDCCH CC. DL CC A-C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Figure 17:
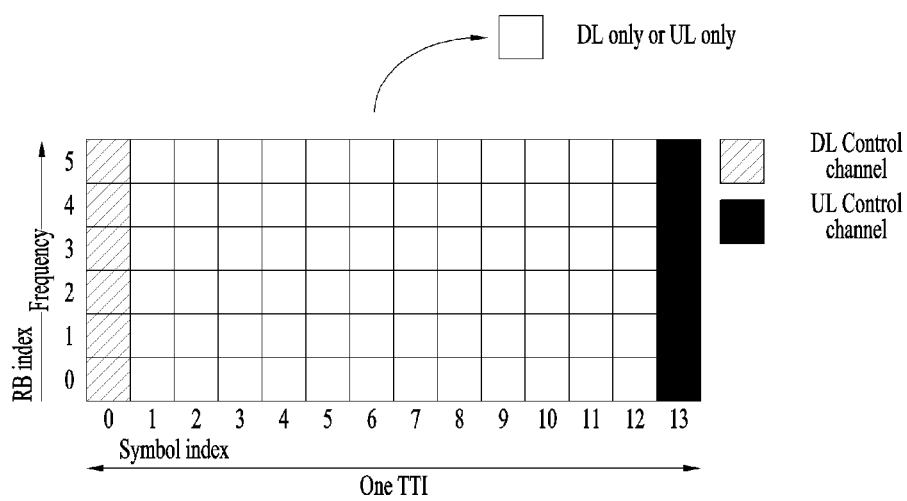
FIG. 17 illustrates a structure of a self-contained subframe.
Figure 18:
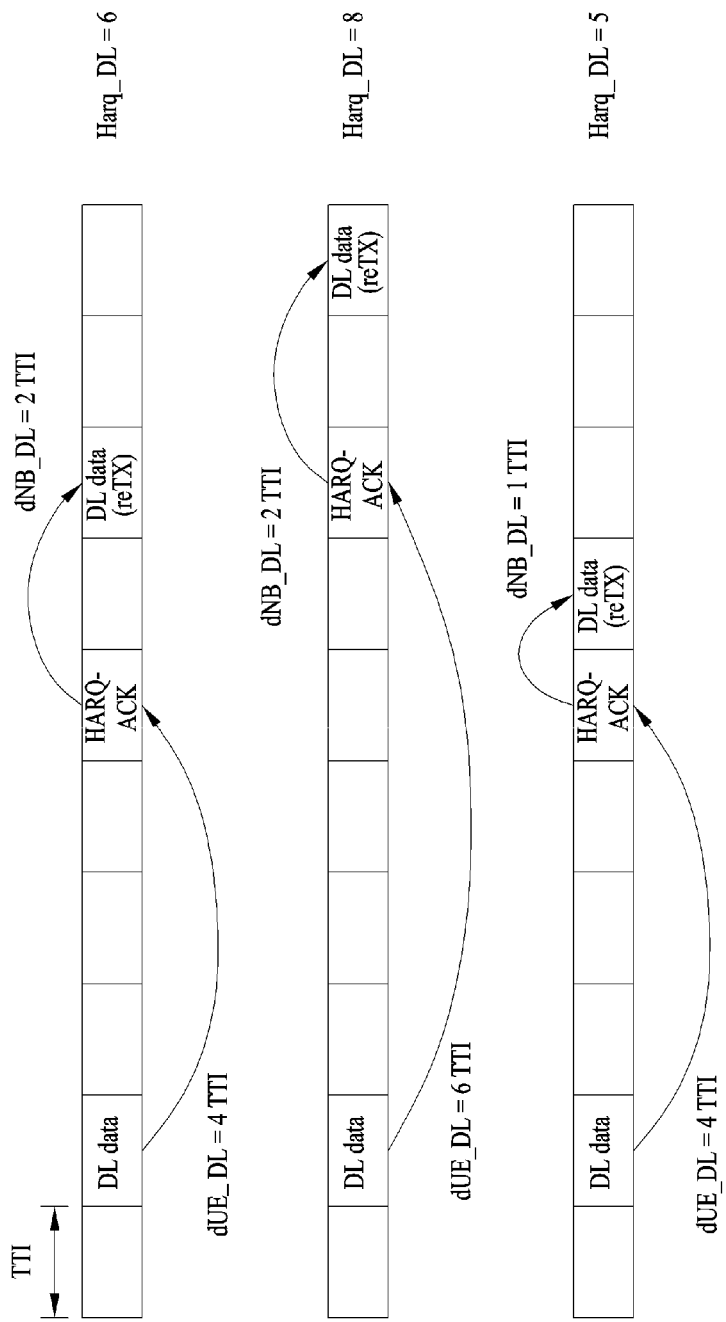
FIGS. 18 to 22 illustrate a signal transmission procedure according to the present invention.
Figure 19:
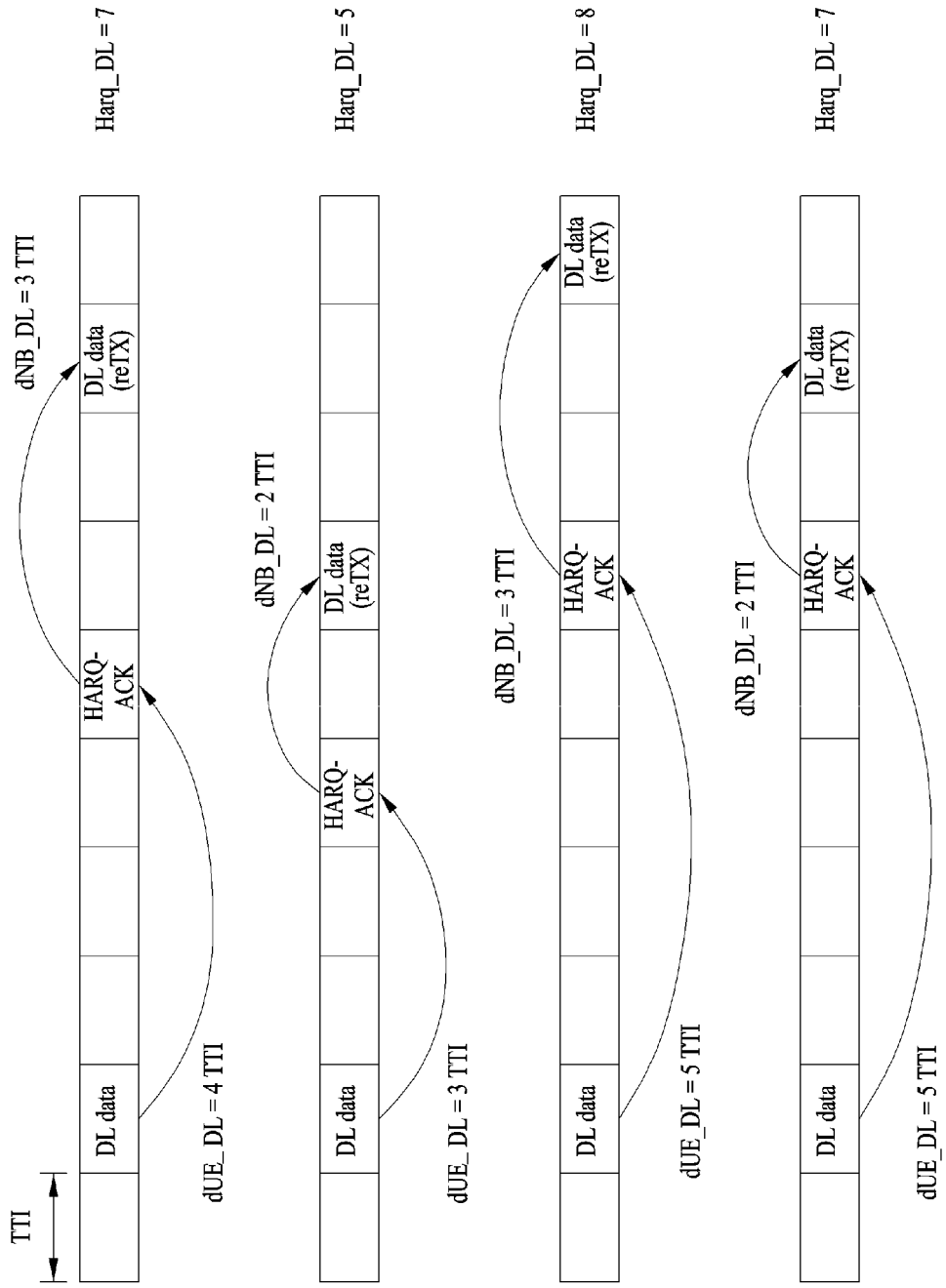
Figure 20:
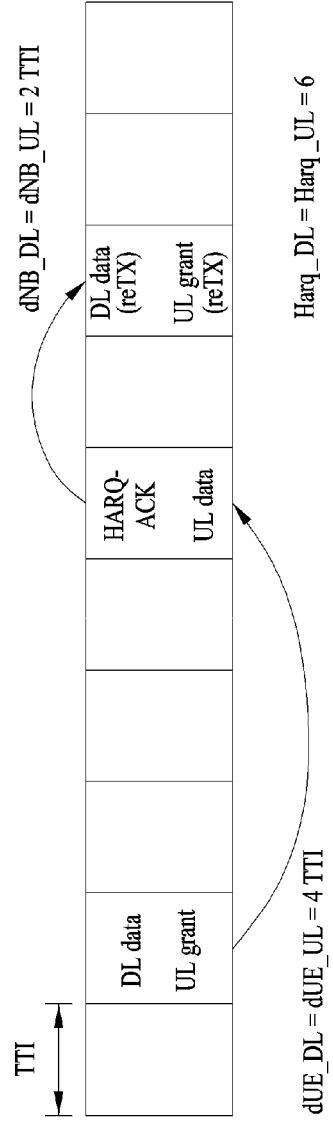
Figure 21:
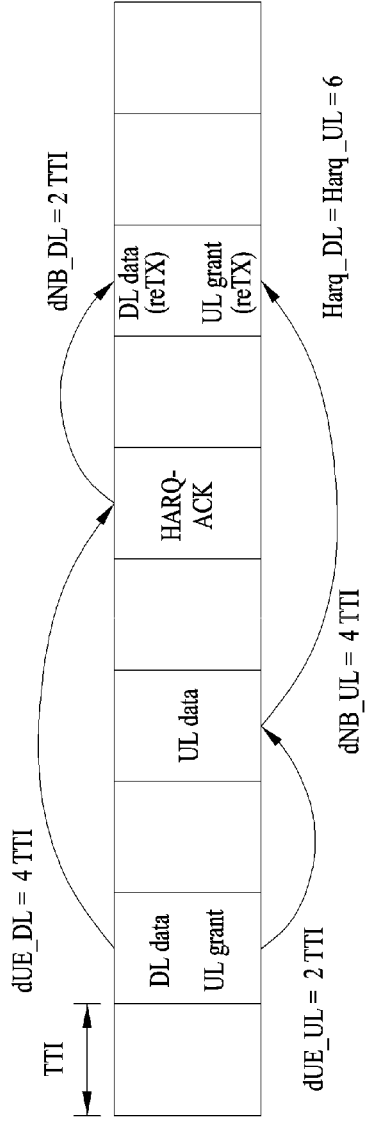

Meanwhile, a next generation RAT (radio access technology) is considering a self-contained subframe to minimize data transmission latency. FIG. 17 illustrates a structure of a self-contained subframe. In FIG. 17, oblique line areas indicate DL control regions and black colored areas indicate UL control regions. Areas having no mark may be used for DL data transmission or UL data transmission. In this structure, DL transmission and UL transmission are performed in due order within one subframe, whereby DL data transmission and UL ACK/NACK transmission can be performed within the subframe. Or, UL grant transmission and UL data reception can be performed within the subframe as well. As a result, the time required for data re-transmission may be reduced when an error occurs in data transmission, whereby latency of final data transfer may be minimized.

Examples of the self-contained subframe type that may be configured in the system may consider four subframe types as follows. The periods are arranged in temporal order.

DL control period+DL data period+GP (guard period)+ UL control period
  DL control period+DL data period
  DL control period+GP+UL data period+UL control period
  DL control period+GP+UL data period PDFICH, PHICH, and PDCCH can be transmitted in a DL control period and PDSCH can be transmitted in a DL data period. PUCCH can be transmitted in a UL control period and PUSCH can be transmitted in a UL data period. A time gap for switching from a transmission mode to a reception mode or vice versa is required for an eNB and a UE. A GP provides the time gap. To this end, some OFDM symbols at the time when DL is switched to UL in the self-contained subframe structure are configured as a GP.

Embodiment

A new radio access technology (RAT) system may be designed to support various use scenarios (or service types and traffic types) such as enhanced mobile broadband (eMBB), ultra-reliable and low latency communications (URLLC), massive machine type communications (mMTC), and so on. The various use scenarios (hereinafter, referred to as use cases) may have different requirements, particularly in terms of (user-plane) latency. For example, the respective use cases may require different (maximum) latencies in the order of URLLC (e.g., 0.5 ms)<eMBB (e.g., 4 ms)<mMTC (e.g., Xms>4 ms). Accordingly, a different TTI length may be set for each use case. For example, different TTI lengths may be given in the order of URLLC<eMBB<mMTC. Herein, a TTI may be defined as a (minimum) time interval between data schedulings or a (maximum) transmission time duration of single data. The (minimum) time interval between data schedulings or the (maximum) transmission time duration of single data may be represented as an integer/real number multiple of a subframe (SF) or slot, or as an integer multiple of OFDM symbols.

Meanwhile, configuration of an HARQ timing and operation of an HARQ process for DL/UL data scheduling/transmission may vary according to a latency requirement/TTI length (a use case represented by the latency requirement/TTI length), and a UE capability related to DL/UL signal processing (e.g., DL control/data channel decoding, UL transmission preparation including encoding, etc.). For example, a (minimum) HARQ timing latency may be set to be smaller for URLLC than for eMBB, whereas the (maximum) number of HARQ processes may be set to be larger for eMBB than for URLLC. Herein, an HARQ timing may represent a delay between DL data reception and HARQ-ACK transmission, a delay between UL grant reception and UL data transmission, or the like, expressed as an integer multiple of a TTI.

Hereinafter, effective methods for configuring DL/UL HARQ timings and operating the HARQ processes considering use cases (or different TTI lengths corresponding thereto) requiring different latencies are proposed. As used herein, (i) TTI and SF may have the same meaning in terms of time length or time period (e.g., an SF offset may be considered as a TTI offset), or (ii) TTI length may be set to different values for respective use cases, and the SF length may be set to a single value that is common to all use cases (e.g., the SF may have the same time duration as a particular one of multiple possible TTI lengths). In the case of (ii), (ii-1) SF may be set to have the same time duration as the minimum TTI (e.g., the TTI length set in URLLC), or (ii-2) SF may be set to have the same time duration as a normal TTI (e.g., a TTI length set in eMBB). In the case of (ii-1), one TTI configured in a specific use case may be composed of one or multiple SFs (or slots). In the case of (ii-2), one TTI configured in a specific use case may be composed of one or multiple SFs (or slots), or a plurality of TTIs may be configured in one SF (or slot).

For convenience of description, the (minimum) HARQ timing latencies required by the UE and the BS are defined as follows.

1) dUE_DL: a delay between DL data reception and HARQ-ACK transmission (at the UE). The UE may report dUE_DL information (capability) thereof to the BS at an appropriate time (e.g., in the initial access or RRC connection procedure). The dUE_DL information and dUE_UL information described below may be supported differently for the same UE.

2) dNB_DL: a delay between HARQ-ACK reception and DL data retransmission (at the BS). The BS may signal the dNB_DL information to the UE at an appropriate time. The dNB_DL information may be configured differently from dNB_UL information described below. Alternatively, the BS may signal the following RTT_DL or HARQ_DL information to the UE at an appropriate time, and the UE may calculate the dNB_DL information based on the RTT_DL or HARQ_DL information.

3) RTT_DL: a (minimum) delay between DL data transmissions of the same HARQ process (e.g., dUE_DL+dNB_DL)

4) Harq_DL: a (maximum) number of DL HARQ processes (e.g. the maximum number of TTIs within RTT_DL). The number of bits for designating the HARQ process ID in the DL grant DCI and/or the number of the initial bits to be stored per DL data (e.g., TB) or HARQ process from the perspective of the DL soft buffer may be determined differently according to the value of HARQ_DL.

5) dUE_UL: a delay between UL grant reception and UL data transmission (at the UE). The UE may report dUE_UL information (capability) thereof to the BS at an appropriate time (e.g., in the initial access or RRC connection procedure). The dUE_UL information and dUE_DL information may be supported differently for the same UE.

6) dNB_UL: a delay between UL data reception and transmission of retransmitted UL grant (at the BS). The BS may signal the dNB_UL information to the UE at an appropriate time. The dNB_UL information may be configured differently from the dNB_DL information. Alternatively, the BS may signal the following RTT_UL or Harq_UL information to the UE at an appropriate time, and the UE may calculate the dNB_UL information based on the RTT_UL or Harq_UL information.

7) RTT_UL: a (minimum) delay between UL data transmissions of the same HARQ process (e.g. dUE_UL+dNB_UL)

8) Harq_UL: a (maximum) UL HARQ process number (e.g. the maximum number of TTIs within RTT_UL). The number of bits for designating the HARQ process ID in the UL grant DCI and/or the number of the initial bits to be buffered per UL data (e.g., TB) or HARQ process from the perspective of the UL soft buffer may be determined differently according to the value of Harq_UL.

FIGS. 18 to 21 illustrate transmission and reception of signals according to a HARQ timing latency. Referring to the figures, the UE may transmit HARQ-ACK dUE_DL after receiving DL data. If the HARQ-ACK is NACK, the BS may retransmit the DL data after dNB_DL. Similarly, the UE may transmit UL data (e.g., PUSCH) dUE_UL after receiving UL grant. If retransmission of the UL data needs to be performed, the BS may transmit a UL grant indicating retransmission of UL data after dNB_UL.

As used herein, the terms TTI length, use case, and subcarrier (SC) spacing (SCS) used in the OFDM modulation and demodulation may have similar meanings or be replaced with each other. For example, a short TTI length may have a similar meaning to a large SCS or URLLC, and a long TTI length may have a similar meaning to a small SCS or mMTC. The normal TTI length (between the short TTI length and the long TTI length) may have a similar meaning to the normal SCS or eMBB (between the small SCS and the large SCS). The HARQ timing latency may be given as an integer multiple (or a real number multiple) of an SF/slot/TTI length or given as an integer multiple of an OFDM symbol interval. Here, the OFDM symbol refers to OFDM-based symbols (e.g., an OFDM symbol, an SC-FDMA symbol, etc.), and may be expressed simply as a symbol. The TTI length may be used in a similar meaning to or replaced with the number of SFs/slots/symbols constituting a single TTI, i.e., the number of SFs/slots/symbols per TTI. For example, the long TTI length may have a similar meaning to a case where the number of SF/slots/symbols per TTI is large, and the short TTI length may have a similar meaning to a case where the number of SF/slots/symbols per TTI is small. As used herein, the terms TTI, SF and slot may be interchangeably used. In addition, in this specification, the terms "long/short/increase/decrease" may mean "relatively long/short/increase/decrease" or mean "long/short/increase/decrease" with respect to a specific reference value. In the latter case, when it is assumed, for example, that the HARQ timing latency (or the minimum HARQ RTT) for TTI length X is set to A TTIs and the HARQ timing latency (or the minimum HARQ RTT) for TTI length Y is set to B TTIs, it may be described that the HARQ timing latency (or the minimum HARQ RTT) of one of the two TTI lengths X and Y is longer/shorter/increased/decreased, depending on the magnitude relationship between A and B. In this specification, eNB and gNB may be used interchangeably. In addition, the schemes described below may be combined with each other.

[Scheme 1] HARQ Processing Delay and HARQ Process Number

In this scheme, a method for managing a data processing delay, the number of HARQ processes associated therewith, and a reception buffer in a terminal (e.g., a UE) and a BS (e.g., an eNB) are proposed. Hereinafter, a HARQ (processing) delay may refer to (i) a time delay dUE_DL between a DL data reception time and a corresponding HARQ-ACK transmission time, or (ii) a time delay dUE_UL between a UL grant reception time and a corresponding UL data transmission time. In addition, for the eNB, the HARQ (processing) delay may refer to (i) a time delay dNB_DL between a HARQ-ACK reception time and a corresponding retransmission DL data scheduling (DL grant transmission) time, or (ii) a time delay (dNB_UL) between a UL data transmission time and a corresponding retransmission UL data scheduling (UL grant transmission) time. The (minimum) HARQ RTT may refer to the (minimum) time delay RTT_DL, RTT_UL between a DL (or UL) data transmission (scheduling) time and a corresponding DL (or UL) data retransmission (scheduling) time (having the same HARQ process ID as the corresponding data).

(1) HARQ Processing Delay

A. UE Delay i. Capable min UE delay (min_dUE_cap): Minimum HARQ delay supportable by a UE according to the category and capability/implementation of the UE ii. Configured min UE delay (min_due_cfg): Minimum HARQ delay among the candidate HARQ delays that the eNB has configured for the UE iii. Configured max UE delay (max_due_cfg): Maximum HARQ delay among the candidate HARQ delays that the eNB has configured for the UE. The maximum configurable value of max_due_cfg may be set to the same value as dUE_default given below.

iv. Default UE delay (dUE_default): A HARQ delay of a UE that the UE assumes/applies before a HARQ delay is set for the UE by the eNB or in the random access procedure B. eNB Delay i. Capable min eNB delay (min_dNB_cap): Minimum HARQ delay supportable by the eNB according to implementation of the eNB and cell management ii. Configured min eNB delay (min_dNB_cfg): Minimum HARQ delay that is set for the UE by the eNB and may be taken at the eNB 1. In a period of min_dNB_cfg form the time of HARQ-ACK transmission for a specific DL HARQ process ID, the UE may operate, assuming/considering that there is no scheduling of DL data (retransmission) having the DL HARQ process ID (corresponding DL grant reception). For example, even if the UE receives scheduling information (e.g., DL grant) about the data (retransmission) having the DL HARQ process ID, the UE may skip the decoding operation for the DL data (retransmission).

2. In a period of min_dNB_cfg from the time of UL data transmission having a specific UL HARQ process ID, the UE may operate, assuming/considering that there is no scheduling of UL data (retransmission) having the UL HARQ process ID (corresponding UL grant reception). For example, even if the UE receives scheduling information (e.g., UL grant) about the data (retransmission) having the UL HARQ process ID, the UE may skip the transmission operation for the UL data (retransmission).

3. min_dNB_cfg may be set to one value regardless of (resetting of) the min UE delay value. As another example, min_dNB_cfg may be automatically set (to, for example, a value equal to the min UE delay or a value proportional to the min UE delay) according to the min UE delay value without separate setting. As another example, min_dNB_cfg may be automatically set according to the max HARQ num value set by the eNB (to, for example, a value obtained by subtracting min UE delay from max HARQ num).

4. The maximum possible value of min_dNB_cfg may be set to the same value as the dNB_default given below.

iii. Default eNB delay (dNB_default): a HARQ delay of the eNB that the UE assumes/applies before a HARQ delay is set for the UE by the eNB or in the random access procedure. It may be predefined in a technical document or may be set by the eNB (through, for example, specific broadcast signaling or system information).

In the following description, min UE delay may refer to min_dUE_cap or min_dUE_cfg, UE max delay may refer to max_dUE_cfg, and min eNB delay may refer to min_dNB_cap or min_dNB_cfg.

(2) HARQ RTT and Process Number

A. HARQ RTT i. Min HARQ RTT (min_RTT): Minimum HARQ retransmission delay supportable by a combination of min UE delay and min eNB delay or a combination of max UE delay and min eNB delay 1. In a period of min_RTT from the time of DL data scheduling having a specific DL HARQ process ID (corresponding DL grant reception), the UE may operate, assuming/considering that there is no scheduling of DL data (retransmission) having the HARQ process ID (DL grant reception). For example, even if the UE receives scheduling information (e.g., DL grant) about the data (retransmission) having the HARQ process ID, the UE may skip the decoding operation for the DL data (retransmission).

2. In a period of min_RTT from the time of UL data scheduling having a specific UL HARQ process ID (corresponding UL grant reception), the UE may operate, assuming/considering that there is no scheduling of UL data (retransmission) having the HARQ process ID (UL grant reception). For example, even if the UE receives scheduling information (e.g., UL grant) about the data (retransmission) having the UL HARQ process ID, the UE may skip the transmission operation for the UL data (retransmission).

3. min_RTT may be determined to be the sum of the min_due_cfg value (or the max_due_cfg value) and the min_dNB_cfg value, or may be set by the eNB.

4. The maximum possible value of min HARQ RTT may be set to the same value as RTT_default given below.

Ii. Default HARQ RTT (RTT_default): Minimum HARQ retransmission delay supportable by the combination of the default UE delay and the default eNB delay 1. RTT_default may be determined to be the sum of dUE_default and dNB_default.

2. RTT_default may be predefined in a technical document or may be set by the eNB (through, for example, specific broadcast signaling or system information).

B. HARQ Process Number i. Actual max HARQ num (max_N_act): Maximum number of HARQ processes that may be divided (into individual TBs) either through a field of the scheduling DCI or from the perspective of processing of the MAC layer 1. Max_N_act may be automatically set according to the combination of the min UE delay (or max delay UE) and the min eNB delay (e.g., it may be automatically set to a value corresponding to min_RTT or the number of SFs (or TTIs) within the period of min HARQ RTT), or may be set by the eNB.

2. The maximum possible value (and minimum possible value) of max_N_act may be limited, and the maximum value (and minimum value) may be set differently (proportionally) according to the values of min UE delay (or max UE delay), min eNB delay, and min HARQ RTT.

3. The maximum possible value of max_N_act may be set to the same value as default max HARQ num given below.

ii. Reference max HARQ num (max_N_ref): Maximum number of HARQ processes that is used as a basis for partitioning/allocating a reception soft buffer (e.g., determining the minimum number of stored bits per TB)

1. Max_N_ref may be predefined to have a specific value (in a technical document), set to a value corresponding to min_RTT (or the number of SFs (or TTIs) within the period of min HARQ RTT), or configured by the eNB.

2. As an example, actual soft buffer partitioning (e.g., determining the minimum number of stored bits per TB) may be performed based on min (max_N_ref, max_N_act) or max_N_ref.

iii. Default max HARQ num (N_default): Maximum number of HARQ processes that the UE assumes/applies at the point in time before HARQ delay, min HARQ RTT, or max HARQ num is set for the UE by the eNB or in the random access procedure.

1. N_default may be set to the same value as max_N_ref, or may be automatically set by a combination of dUE_default and dNB_default (e.g., it may be set to a value corresponding to RTT_default or to the number of SFs (or TTIs) within the period of default HARQ RTT). Alternatively, N_default may be set to the number of HARQ processes corresponding to the maximum HARQ RTT (Ymax i ms: maximum time in which peak rate data can be successively received/stored).

2. N_default may be predefined in a technical document or may be set by the eNB (through, for example, specific broadcast signaling or system information).

In the following description, max HARQ num may refer to actual max HARQ num. Min HARQ RTT used in determining max HA RQ num may have the following meanings according to the DL/UL configuration attribute.

For dynamic TDD (DL/UL configuration is changed dynamically), it may refer to the number of SFs (or TTIs) in RTT regardless of DL/UL.

For semi-static DL/UL configuration-based TDD or FDD, it may refer to the number of DL SFs (or TTIs) in RTT in the case of DL and refer to the number of UL SFs (or TTIs) in RTT in the case of UL.

(3) HARQ Parameter Setting #1

A. Method 1-1: Determination Only by Min UE Delay (or Max UE Delay)

With only min UE delay (and max UE delay) set by the eNB, max HARQ num, min HARQ RTT, and min gNB delay may be determined based only on min UE delay (or max UE delay) (by the UE).

1. For example, it may be set that max HARQ num=min HARQ RTT=L×min UE delay (or, L−max UE delay), and it may be assumed/applied that min gNB delay=min UE delay (or max UE delay).

2. L may be predefined to be a specific value (e.g., 2) or configured by the eNB.

B. Method 1-2: Determination by the Combination of Min UE Delay (or Max UE Delay) and Min eNB Delay With min UE delay (and max UE delay) and min eNB delay set by the eNB, max HARQ num and min HARQ RTT may be determined based on the parameters (by the UE). For example, it may be set that max HARQ num=min HARQ RTT=min UE delay (or max UE delay)+min gNB delay.

C. Method 1-3: Determination by the Combination of Min UE Delay (or Max UE Delay) and Max HARQ Num With min UE delay (and max UE delay) and max HARQ num set by the eNB, min HARQ RTT and min gNB delay may be determined based on the parameters (by the UE).

1. As an example, it may be set that min HARQ RTT=max HARQ num, and min gNB delay=max HARQ num−min UE delay (or max UE delay).

2. For a specific UE type (category) (hereinafter, UE type 1), only values satisfying max HARQ num≤min UE delay+D may be set. For the other specific UE type (category) (hereinafter, UE type 2), only values satisfying max HARQ num≥min UE delay+D may be set.

3. D may be D>1. For example D may be set to 1 (or to the same value as min eNB delay).

4. UE type 1 may be considered as a UE type in which at least one of the maximum TB size, the total soft buffer size, and the maximum operating frequency bandwidth is below a specific level.

D. Method 1-4: Setting Min HARQ RTT to be Equal or Proportional to Max HARQ Num

The value of one parameter of min HARQ RTT and max HARQ num may be set by the eNB, and the value of the other parameter may be set to be equal to or proportional to the set value. For example, when max HARQ num=N is set by the eNB, min HARQ RTT may also be set to N.

E. Method 1-5: Setting Min HARQ RTT and Max HARQ Num Independently

Min HARQ RTT and max HARQ num may be independently set by the eNB. However, embodiments are not limited thereto. In case of UE type 1, only values satisfying max HARQ num≤min HARQ RTT may be set. In case of UE type 2, only values satisfying max HARQ num≥min HARQ RTT may be set.

F. Method 1-6: Setting Min HARQ RTT and Reference Max HARQ Num Independently

Min HARQ RTT and reference max HARQ num may be independently set by the eNB. However, embodiments are not limited thereto. In case of UE type 1, only values satisfying reference max HARQ num<min HARQ RTT may be set. the min HARQ RTT, if the UE type 2, In case of UE type 2, only values satisfying reference max HARQ num>min HARQ RTT may be set.

G. Method 1-7: Setting Max_N_Act and Max_N_Ref to have the Same Value or Different Values Max_N_act and max_N_ref may be set based on min UE delay and/or max UE delay and/or min eNB delay (by the UE).

1. As an example, it may be set that max_N_act=max UE delay+min eNB delay (or, L×max UE delay), and max_N_ref=max UE delay (or min UE delay)+min eNB delay.

2. As another example, it may be set that max_N_act=min UE delay+min eNB delay (or, L×min UE delay), and max_N_ref=min UE delay+min eNB delay.

3. L may be predefined to be a specific value (e.g., 2) or configured by the eNB.

H. Method 1-8: Determination by Min UE Delay (or Max UE Delay) and L

Min HARQ RTT (and min gNB delay) may be determined (by the UE) based on the value of parameter L and the value of min UE delay (and max UE delay) set by the eNB.

1. As an example, the UE may determine min HARQ RTT to be min HARQ RTT=L×min UE delay (or, L−max UE delay) or min HARQ RTT=min UE delay+L (or, max UE delay+L). The UE may operate on the assumption that min HARQ RTT is the minimum scheduling time interval for the same HARQ process.

2. The UE may determine min gNB delay to be min gNB delay=min HARQ RTT−min UE delay (or, min HARQ RTT−max UE delay). The UE may operate on the assumption that min gNB delay is the minimum scheduling time for the same HARQ process.

3. L may be predefined to be a specific value (e.g., 2, 4) or configured by the eNB.

I. Method 1-9: Setting a Range of Possible Values of Actual Max HARQ Num

The minimum possible value of actual max HARQ num (max_N_act) may be determined by min UE delay, and the maximum possible value may be determined by max UE delay (by the UE).

1. As an example, the minimum possible value of max_N_act may be determined by (min UE delay+X) and the maximum possible value may be determined by (max UE delay+X). Here, X may be configured to be one of min gNB delay, parameter L, min UE delay or max UE delay.

2. As another example, only values satisfying (actual) max HARQ num<min HARQ RTT or (actual) max HARQ num>min HARQ RTT may be set for any UE (without distinguishing between the UE types).

3. As another example, values satisfying (actual) max HARQ num<min HARQ RTT may be set in the case of dynamic TDD, and (in which DL/UL configuration is dynamically changed), and values satisfying (actual) max HARQ num>min HARQ RTT may be set in the case of semi-static DL/UL configuration-based TDD or FDD.

(4) HARQ Parameter Setting #2

A. Method 2-1: Assigning a Fixed Buffer Size for Specific DL Data Reception

A fixed minimum soft buffer size may be assigned to specific DL data reception (i.e., the minimum number of stored bits per TB may be fixed).

1. Even in the reconfiguration of max HARQ num (corresponding repartition of the soft buffer), the minimum soft buffer size may not be changed for specific DL data reception.

2. The specific DL data may have a specific HARQ process ID, be scheduled by a specific DCI format, or be DL data for which a default UE delay is indicated.

3. The minimum soft buffer size for the specific DL data may be set to a soft buffer size obtained through partition based on the value of max_N_ref.

B. Method 2-2: Setting HARQ parameters independently for DL and UL

Values of parameter such as UE delay, eNB delay, HARQ RTT, and HARQ num may be set independently (e.g., to different values) for DL HARQ and UL HARQ.

1. The parameters may include min UE delay, max UE delay, default UE delay, min eNB delay, default eNB delay, min HARQ RTT, default HARQ RTT, max HARQ num, and default HARQ num.

C. Method 2-3: Report/Configure Min_dUE_Cap and dUE_Default According to Subcarrier Spacing (SCS) and BW The UE may report a value of min_dUE_cap (e.g., a different value) independently according to the SCS and the operating BW used in the OFDM modulation/demodulation on the system/cell which the UE accesses. Here, the operating BW includes, for example, the overall system BW (hereinafter, system BW), the maximum operating BW of the UE (hereinafter, max UE BW), or a UE operating BW configured by the eNB (hereinafter, cfg UE BW). The value of dUE_default may also be set differently according to the SCS and BW.

1. As an example, the UE may operate to report the value of min_dUE_cap for a specific TB size (e.g., max TB size) based on the system BW, and/or max UE BW, and/or the configured UE BW (and the SCS value of the system/cell that the UE accesses). In this case, different values of min_dUE_cap may be determined/reported for the same operating BW depending on the SCS size. Alternatively, different values of min_dUE_cap may be determined/reported for the same SCS depending on the operating BW size.

2. As another example, dUE_default may be set to different values for the same system BW depending on the SCS size. Alternatively, dUE_default may be set to different values for the same SCS depending on the system BW size. In this case, the value of dUE_default set based on the system BW may be applied only to UE type 2, and the value of dUE_default to be applied to UE type 1 may be set based on max UE BW (and SCS value) having a specific size smaller than the system BW.

D. Method 2-4: Operating the Soft Buffer in the Situation of Operation with Multiple TTI Lengths When the HARQ operation is performed based on a plurality of different TTI lengths, the following soft buffer allocation scheme may be considered for each TTI length (by the eNB/UE). For simplicity, a large TTI length is defined as L-TTI, and the maximum number of HARQ processes configured in the L-TTI is defined as N. Also, a small TTI length is defined as S-TTI and the maximum number of HARQ processes configured in the S-TTI is defined as M.

1. Opt 1: For each TTI length, a minimum buffer size per TB may be allocated based on the total buffer size. For example, in the case of L-TTI, the total buffer size may be divided into N sizes and the minimum buffer size may be allocated per TB. In the case of S-TTI, the total buffer size may be divided into M sizes, and the minimum buffer size may be allocated per TB.

2. Opt 2: The total buffer size may be divided according to the TTI length, and the minimum buffer size may be allocated per TB based on a partial buffer size allocated to a corresponding one of the TTI lengths. For example, when the total buffer size S is divided at the ratio of A:B (for example, 0<B<A<1, A+B=1), a partial buffer size (A×S) may be divided into N sizes in case of L-TTI, and a partial buffer size (B×S) may be divided into M sizes in case of S-TTI. Thereby, the minimum buffer size per TB may be allocated.

3. Opt 3: The minimum buffer size per TB may be allocated based on the total buffer size in case of L-TTI and based on a partial buffer size in case of S-TTI. For example, in the case of L-TTI, the total buffer size S may be divided into N sizes. In the case of S-TTI, a partial buffer size (B×S) may be divided into M sizes. Thereby, the minimum buffer size per TB may be allocated.

4. With buffer dimensioning applied as above, transmission and retransmission over different TTI lengths may be performed on the same data (e.g., TB). In this case, the minimum buffer size of the corresponding TB may be allocated as the minimum buffer size per TB configured for the TTI length used for initial transmission (not retransmission) of the corresponding TB.

5. Here, the TTI length may be replaced with a duration (e.g., the number of symbols) indicated for data transmission with the actual TTI fixed/set to one TTI. For example, the L-TTI may be replaced with a data duration consisting of a specific number symbols or more symbols, and the S-TTI may be replaced with a data duration consisting of symbols fewer than the specific number of symbols.

E. Method 2-5: Reporting Min_Due_Cap According to a Combination of TBS/BW/SCS/TTI The UE may operate to report min_dUE_cap thereof to the eNB according to each combination of (a plurality of) TB sizes (TBS) specifically configured (e.g., predefined for each frequency band), a BW size, an SCS value, and TTI length. Further, the eNB may signal to the UE a combination of a specific TBS, a BW size, an SCS value and a TTI length by which min_dUE_cap is determined, and the UE may report min_dUE_cap thereof to the eNB according to the signaled combination.

F. Method 2-6: Reporting Min_Due_Cap According to DL Control Channel Type and Configuring Candidate HARQ Delay The UE may report the value of min_dUE_cap to the eNB according to the type of a DL control channel used for scheduling of a DL/UL shared (data) channel. For example, the UE may independently report the value of min_due_cap to the eNB depending on whether a DL control channel used for scheduling of a DL/UL shared (data) channel is configured in a manner of being subjected to TDM with the DL data channel transmission interval while occupying a small number of symbols with a relatively low (maximum) symbol index within one TTI/SF/slot as in the case of the existing PDCCH of LTE (wherein the TDM scheme has a structure in which the control channel is mapped/transmitted ahead of the data channel) (hereinafter, control type 1), or is configured in a manner of being subjected to FDM with the DL data channel transmission region while occupying a large number of symbols with a relatively high (maximum) symbol index as in the case of the EPDCCH of LTE (hereinafter, control type 2). (For example, the UE may report different values independently for the respective control types, or report a greater value for control type 2 than for control type 1).

The types of DL control channels may be distinguished not only by TDM or FDM with the DL data channel transmission interval but also by a gap between the last symbol of the control channel and the last symbol of a DL data channel scheduled from the control channel in one TTI/SF/slot (or may be defined by a function for the gap). For example, the value of the gap for control type 1 may be greater than that for control type 2. The function for the gap may be defined by a specific equation or table.

Accordingly, a candidate HARQ delay set configured for the UE by the eNB may also be configured for each DL control channel type independently (for example, differently or so as to have a greater value for control type 2 than for control type 1). The default UE delay may also be set to different values according to the DL control channel types.

Here, the HARQ delay of the data retransmitted from the eNB may be subjected to the following options.

1. Opt 1: Determined according to a control channel type used for initial transmission scheduling of retransmission data
2. Opt 2: Determined according to a control channel type used for scheduling of the retransmission data
3. Opt 3: Determined to be the greater HARQ delay value between the HARQ delay determined according to the control channel type used for the initial transmission scheduling of the retransmission data and the HARQ delay determined according to the control channel type used for retransmission scheduling G. Method 2-7: Report Min_dUE_Cap According to a DL/UL Data Signal Mapping Method and Configure Candidate HARQ Delays.

The UE may report the value of min_dUE_cap independently according to how the DL/UL data signal is mapped, for example, whether the DL/UL data signal is mapped in a frequency first-time second manner (hereinafter, mapping type 1) as in the case of the existing PDSCH of LTE, or in a time first-frequency second manner (hereinafter, mapping type 2) as in the case of the PUSCH of LTE. (For example, the UE may report different values or report a greater value in the case of mapping type 1 than in the case of mapping type 2).

Accordingly, a candidate HARQ delay configured for the UE by the eNB may also be set independently for each DL/UL data signal mapping method (for example, set differently or set such that a greater value is set in the case of mapping type 2 than in the case of mapping type 1). The default UE delay may also be set differently according to the DL/UL data mapping scheme.

H. Method 2-8: Set Different Default UE Delay Values Applied to UEs that Use PRACH Resources According to the Resources The value of the default UE delay applied to a UE performing/completing the (initial) random access procedure through use/transmission of a PRACH resource (which may be a form that is distinguished by, for example, at least one of time, frequency, sequence, and format) may be set differently for each PRACH resource. Such setting may be signaled (broadcast) to the UE via transmission of system information (e.g., SIB) (including PRACH resource configuration information).

Accordingly, the UE selects one of PRACH resources for which dUE_default corresponding to a value greater than or equal to the value of min_dUE_cap of the UE is set among a plurality of different dUE_default values set for different PRACH resources to transmit a PRACH. Thereby, the UE may operate to perform the (initial) random access procedure.

I. Method 2-9: Report Min_Due_Cap and Configure HARQ Delay According to a Timing Offset Set Between Cells/Carriers in a CA Situation In a situation where CA of a plurality of cells/carriers (collectively referred to as cells) is configured for one UE, a scheduling cell for performing DL control channel transmission and a scheduled cell for performing DL/UL data channel transmission scheduled from the DL control channel may be configured differently (i.e., cross-carrier scheduling may be performed), and there may be a (non-zero) timing offset set in an SF/slot/symbol unit that corresponds to a level higher than or equal to a certain level between the two cells. In this case, the UE may report the timing offset set information present between the two cells to the eNB, or report the min_dUE_cap information to the eNB based on the timing offset set information. Thus, a candidate HARQ delay set may be configured independently (for example, to have a different value) for each of a plurality of scheduled cells for which the same scheduling cell is configured, or different candidate HARQ delay sets may be configured for a case where the scheduling cell and the scheduled cell employ the same (UL) timing advance (TA) (i.e., the cells belong to the same TA group) and a case where the two cells employ different TAs (i.e., the cells belong to different TA groups).

J. Method 2-10: The UE is Caused to Report the Maximum Decoding Capability Thereof or Corresponding Information to the gNB.

The UE may report the maximum decoding capability thereof or information related to a specific (e.g., minimum) HARQ process number K corresponding to the maximum decoding capability to the gNB, assuming that a specific (e.g., nominal) code rate (e.g., 1/2). Thereby, the gNB may recognize the maximum TB size information about the UE (at the specific (e.g., nominal) code rate (e.g., 1/2)). Here, the maximum decoding capability of the UE indicates the maximum number of (decodable)/supportable encoded bits of the UE. In addition, the number of bits corresponding to the total soft buffer size divided by a specific (e.g., minimum) HARQ process number K may be the maximum number of (decodable/supportable) encoded bits of the UE.

[Scheme 2] Minimum HARQ RTT and Soft Buffer Management According to SCS (or TTI Length)

In this scheme, a method for managing the minimum HARQ RTT and soft buffer according to the SCS (a TTI length based thereon) is proposed.

(1) Reference HARQ Parameter Set

First, a HARQ parameter set that is a reference for UE implementation (or a target of UE performance) may be considered as follows.

1) Subcarrier spacing (SCS): K [kHz]
2) TTI length: L [ms]
   N OFDM symbol intervals based on SCS=K [kHz]
3) Maximum aggregated BW: B [MHz] (=M [RBs])
   Maximum reception BW or maximum number of RBs based on SCS=K [kHz]
4) Maximum TBS (over maximum BW): A [bits]
   Maximum TB size schedulable in L [ms], which is a TTI length
   When the maximum BW is configured by CA of Nc carriers (with the same BW), the maximum TBS per carrier may actually be A/Nc [bits].
5) Minimum HARQ RTT: Y [ms]
   It may be determined according to the minimum HARQ processing time at the UE (and eNB) (corresponding to the capable min UE delay of Scheme 1).
6) Reference HARQ process number: Z (=Y/L)
   the maximum number of HARQ processes that are schedulable for Y [ms], which is a HARQ RTT
7) Total soft buffer size: X [bits]
   the total soft buffer size capable of storing (nominal (or target or reliable) code rate-based) soft (encoded) bits for the maximum TBS A [bits] with respect to Z HARQ processes
   Different UEs may support different values of minimum HARQ RTT Y [ms], while supporting the same maximum TBS A [bits] and/or the same total soft buffer size X [bits]

Next, soft buffer dimensioning based will be described on the above-described reference HARQ parameter set. Soft buffer dimensioning means dividing the entire soft buffer into (the minimum) buffer sizes per TB.

1) Minimum buffer size per TB: X/Z [bits]
   Z denotes the maximum value used for soft buffer dimensioning (hereinafter, the maximum buffer dimensioning value)
   Even if a HARQ process number greater than Z is set, the minimum buffer size per TB is limited to X/Z [bits].
   When the HARQ process number is set to Zs which is less than Z, the minimum buffer size per TB may be set to X/Zs [bits].
   When the maximum BW is composed of Nc carriers (with the same BW), the minimum buffer size per TB for each carrier may be X/(Z/Nc) [bits].

(2) HARQ Parameters for a Shorter TTI Length

Modified HARQ parameters that may be considered for use in a TTI length shorter than the reference SCS-based TTI length (e.g., the normal TTI) are as follows.

1) Common parameters
   SCS: 2K [kHz]
   TTI length (N OFDM symbols): L/2 [ms]
   Maximum BW: B [MHz]=M/2 [RBs]
   Maximum TBS (per TTI): A/2 [bits]
   Total soft buffer size: X [bits]

2) HARQ parameter set 1
   Minimum HARQ RTT: Y [ms]
   Reference HARQ process number: 2Z (=Y/(L/2))
   Minimum buffer size per TB (maximum TBS=A/2): X/(2Z) [bit s]
   Note: This parameter set is the same as or similar to the reference parameter set in terms of data (decoding) performance and signal processing speed.
   In this case, 2Z is the maximum value used for soft buffer dimensioning.

3) HARQ parameter set 2
   Minimum HARQ RTT: Y' [ms] (Y/2≤Y'<Y)
   Reference HARQ process number: Z' (Z≤Z'<2Z)
   Minimum buffer size per TB (maximum TBS=A/2): X/Z' [bits] (X/Z'>X/(2Z))
   Note: This parameter set achieves improved performance (coding) gain and decrease in latency over the reference parameter set, while requiring faster signal processing speed (and the maximum applicable TA is limited to a smaller value).
   In this case, 2Z is the maximum value used for soft buffer dimensioning.

Here, by replacing "2" with an arbitrary integer "C" (e.g., replacing the SCS with C×K [kHz]), the present invention may be generalized to any short TTI length.

(3) HARQ Parameters for TTI Length

Modified HARQ parameters that may be considered for use in a TTI length longer than the reference SCS-based TTI length (e.g., the normal TTI) are as follows.

1) Common parameters
   SCS: K/2 [kHz]
   TTI length (N OFDM symbols): 2L [ms]
   Maximum BW: B [MHz]=2M [RBs]
   Maximum TBS (per TTI): 2A [bits]
   Total soft buffer size: X [bits]

2) HARQ parameter set 1
   Minimum HARQ RTT: Y [ms]
   Reference HARQ process number: Z/2 (=Y/(2L))
   Minimum buffer size per TB (maximum TBS=2A): X/(Z/2) [bits]
   Note: This parameter set is the same as or similar to the reference parameter set in terms of data (decoding) performance and signal processing speed.
   In this case, Z/2 is the maximum value used for soft buffer dimensioning.

3) HARQ parameter set 2
   Minimum HARQ RTT: Y' [ms] (Y<Y'≤2Y)
   Reference HARQ process number: Z' (Z/2<Z'≤Z)
   Minimum buffer size per TB (maximum TBS=2A): X/Z' [bits] (X/Z'<X/(Z/2))
   Note: This parameter set is operable at a lower signal processing speed than the reference parameter set (additionally, the maximum applicable TA is allowed up to a larger value), while being degraded in terms of (decoding) performance and latency reduction.
   In this case, Z/2 is the maximum value used for soft buffer dimensioning Here, by replacing "2" with an arbitrary integer "C" (e.g., replacing the SCS with K/C [kHz]), the present invention may be generalized to any longer TTI length.

(4) HARQ Parameter-Related UE Operation

Based on the above configuration, the UE may report, to the eNB, the entirety or a specific part of the HARQ parameter set for each SCS/TTI length (/frequency band) in a set of a plurality of specific different SCSs or TTI lengths (or frequency bands). As described above, the HARQ parameter set may include, for example, the maximum aggregated BW (or maximum BW per carrier), the maximum TBS (over the maximum BW or per carrier), the minimum HARQ RTT (with capable UE delay), a reference HARQ process number, and the maximum buffer dimensioning value.

In the case of a shorter TTI length, a rule may be defined such that different HARQ parameter sets are implemented according to a (peak) data rate/latency requirement of the UE or a target service application type (e.g., a type among eMBB/URLLC/mMTC). For example, an eMBB (or mMTC) targeting UE may be configured to use HARQ parameter set 1 and a URLLC targeting UE may be configured to use HARQ parameter set 2 (e.g., the minimum HARQ RTT may be implemented as Y'=Y/C [ms]. Even in the case of a longer TTI length, a rule may be defined such that different HARQ parameter sets are implemented according to a (peak) data rate/latency requirement of the UE or a target service application type (e.g., a type among eMBB/URLLC/mMTC). For example, an eMBB (or URLLC) targeting UE may be configured to use HARQ parameter set 1 and a mMTC targeting UE may be configured to use HARQ parameter set 2 (e.g., the minimum HARQ RTT may be implemented as Y'=Y×C [ms]).

In addition, when HARQ parameter set 1/2 in the shorter TTI length is defined as S-TTI set 1/2 and HARQ parameter set 1/2 in the longer TTI length is defined as L-TTI set 1/2, the same UE may be specified/limited not to report (implement/request) the combination of S-TTI set 2 and L-TTI set 2. Given that TTI length 1>TTI length 2>TTI length 3>TTI length 4, if change from TTI length 1 to TTI length 2 is reported (implemented) with S-TTI set 2 and change from TTI length 2 to TTI length 3 is reported (implemented) with S-TTI set 1, change from TTI length 3 to TTI length 4 may be specified/limited to report (implement) only S-TTI set 1 (namely, report (implement/request)S-TTI set 2). Further, given that TTI length 1<TTI length 2<TTI length 3<TTI length 4, if change from TTI length 1 to TTI length 2 is reported (implemented) with L-TTI set 2 and change from TTI length 2 to TTI length 3 is reported (implemented) with L-TTI set 1, change from TTI length 3 to TTI length 4 may be specified/limited to report (implement) only L-TTI set 1 (namely, report (implement/request) L-TTI set 2).

(5) UE Category by (Peak Data Rate, Minimum HARQ RTT, Soft Buffer Size)

It is proposed that the UE category be specified according to a combination of the peak data rate, minimum HARQ RTT, and soft buffer size. The UE category may be understood as a representative value/index that represents various kinds of information used in classification of the UE category. Accordingly, the UE may deliver various kinds of information used to specify the UE category to the eNB through the UE category, and the eNB may use the information obtained through the UE category to configure, for the UE, various kinds of information (for example, see Scheme 1) necessary for HARQ operation.

First, three parameters for specifying a UE category are defined below.

1) Peak data rate ($X_i$ Gbps): Maximum number of data (information) bits that can be received in a single slot or TTI 2) Minimum HARQ RTT ($Ymin_i$ ms): Minimum interval between (re)transmissions of the same data (e.g., TB) (minimum achievable latency)

3) Maximum HARQ RTT ($Ymax_i$ ms): Maximum time for which the peak rate data can be continuously received/stored 4) Soft buffer size ($Z_i$ bits)=$X_i$[Gbps]×$Ymax_i$ [ms]×A 5) 'A' may be determined as a function of a specific (e.g., lowest) coding rate R and/or a maximum allowable number of transmissions T (e.g., 4). For example, A may be A=min (1/R, T).

6) R may be determined as the minimum (e.g., mother) coding rate without rate-matching or puncturing, or a specific target coding rate higher than the minimum rate.

7) $Ymax_i$ may be greater than or equal to $Ymin_i$, depending on UE implementation. In the following description, $Y_i$(or Y) may be set to $Ymax_i$ (or $Ymin_i$). In the description above and below, $Y_i$(or Y) may mean $Ymax_i$ (or $Ymin_i$).

Based on the definition above, UE category C i may be defined as a combination of ($X_i$, $Y_i$, $Z_i$). Accordingly, possible UE categories may be defined in ascending category order as follows.

1) $C_1$=(X, Y, Z)

A. a UE category defined by a combination of peak rate X and minimum RTT Y, and buffer size Z 2) $C_2$=(X, Y', Z'), where Y'<Y, and Z'<Z A. Comparison with $C_1$ Support for the same peak rate Support for a smaller minimum latency based on a (faster) processing capability supporting a smaller minimum RTT Support for a smaller (maximum) HARQ process number for peak rate data transmission due to a smaller buffer size The buffer size may be determined (reduced) in proportion to the minimum RTT (e.g., Y'/Y=Z'/Z). For UEs having different combinations of (minimum RTT, buffer size) and the same ratio between two parameters (e.g., Y/Z=Y'/Z') may be differentiated/defined as different UEs in the UE category (order).

B. The minimum RTT (or minimum latency) and buffer size which are supportable for a plurality of UEs supporting the same peak rate may be implemented differently for each of the UEs, and the minimum RTT and buffer size may be determined so as to be in proportion to each other.

3) $C_3$=(X, Y', Z), where Y'<Y.

A. Comparison with $C_1$

Support for the same peak rate

Support for smaller minimum latency based on a (faster) processing capability supporting smaller minimum RTT Support for the same (maximum) HARQ process number for peak rate data transmission based on the same buffer size B. The minimum RTT (or corresponding minimum latency) which are supportable for a plurality of UEs supporting the same peak rate and buffer size may be implemented differently for each of the UEs. In addition, the buffer size may be differently implemented even for each of a plurality of UEs supporting the same peak rate and minimum RTT.

4) $C_4$=(X', Y', Z), where X'>X, and Y'<Y.

A. Comparison with $C_1$

Support for a higher peak rate

Support for a smaller minimum latency based on a (faster) processing capability supporting a smaller minimum RTT Support for a smaller (maximum) HARQ process number for peak rate data transmission due to the same buffer size The peak rate may be determined (increased) in proportion to the maximum supportable BW capability of the UE.

The peak rate and the minimum RTT may be determined such that the product thereof is constant (e.g., X*Y=X'*Y') while being in inverse proportion to each other. UEs having different combinations of (peak rate, minimum RTT) and constant product of two parameters may be distinguished/defined as different UEs in the UE category (order).

B. The peak rate and/or minimum RTT (or minimum latency) which are supportable for a plurality of UEs supporting the same buffer size (and/or minimum RTT) may be implemented differently for each of the UEs. In this case, the peak rate and the minimum RTT may be determined so as to be in inverse proportion to each other 5) $C_5=(X', Y', Z'')$, where X X'>X, Y'<Y, and Z''>Z.
  A. Comparison with $C_1$
  Support for a higher peak rate
  Support for a smaller minimum latency based on a (faster) processing capability supporting a smaller minimum RTT
  Support for the same (maximum) HARQ process number for peak rate data transmission based on a larger buffer size
  The buffer size may be determined (e.g., increased) in proportion to the peak rate (e.g., $Z''=Z\cdot(X'/X)$)
  B. The buffer size may be implemented differently for each of a plurality of UEs supporting the same peak rate and minimum RTT.

In the description above, the peak (data) rate may refer to an instantaneous peak rate that can be achieved within a given period of time with respect to a scheduling unit time (which may be a TTI or slot or subframe, and is referred to as TTI simplicity).

When UEs support the same peak rate, different UE types (e.g., categories or capabilities) may be considered according to a combination of the minimum (HARQ) RTT and the (soft) buffer size as follows. For simplicity, a buffer size capable of supporting continuous/persistent (peak rate) data reception during one or more TTIs corresponding to the minimum RTT is defined as a "nominal buffer size."

1) UE types supporting different combinations of (minimum RTT, buffer size) while supporting the same peak rate
  A. UE type A: a UE type that supports a soft buffer size larger than the nominal buffer size corresponding to the minimum RTT supported by the UE
  B. UE Type B: a UE type that supports the same soft buffer size as the nominal buffer size corresponding to the minimum RTT supported by the UE
  C. UE Type C: a UE type that supports a soft buffer size smaller than the nominal buffer size corresponding to the minimum RTT supported by the UE
  UE types A/B/C may be implemented so as to support the same minimum RTT (namely may support different buffer sizes) (if they support the same peak rate). Alternatively, the UE types A/B/C may be implemented so as to support the same buffer size (namely, may support different minimum RTTs) (if they support the same peak rate).

In addition, in the case of UE types A/B/C, a degree of freedom in implementation may be defined for each UE type according to a data rate requirement, a latency requirement, a duplexing mode, and the like. As an example, when the required data rate is higher than or equal to a specific level (e.g., X bps), UE types A/B (or all UE types A/B/C) are implementable. On the other hand, when the required data rate is lower than the specific level, a rule may be defined such that implementation is allowed only for UE type (or UE types B/C). As another example, when the required latency is lower than or equal to a specific level (e.g., Y msec), UE types A/B (or UE type B) are implementable. On the other hand, when the required latency exceeds the specific level, a rule may be defined such that implementation is allowed only for UE type C (or UE types B/C). As another example, for a UE that supports TDD operation (when the required data rate is higher than or equal to a specific level (e.g., X bps)), all UE types A/B/C are implementable. On the other hand, for a UE that supports FDD operation, a rule may be defined such that implementation is allowed only for UE types A/B.

In the NR system, the (maximum) HARQ process number may be set to a specific value for the UE by the gNB, and/or may be determined to be a different value according to the SCS/TTI or the like. Based on such a configurable or variable HARQ process number and a combination of (minimum HARQ RTT, soft buffer size) that is supported by the UE, (actual) HARQ RTT setting and buffer dimensioning may be performed as follows. For simplicity, the number of TTIs corresponding to the minimum RTT interval is defined as a "nominal HARQ number." Also, the minimum time delay (which is set to be greater than or equal to the minimum RTT which is the UE capability) between the actual data transmission and retransmission (with the same HARQ process ID) is defined as an actual HARQ RTT.

1) Actual RTT and buffer dimensioning according to a HARQ process number and a combination of (minimum RTT, buffer size)
  A. Actual HARQ RTT: set to the greater one of the nominal HARQ number X corresponding to the minimum RTT of the UE and a HARQ process number Y (set by, for example, the gNB)
  For example, when Y is set to be greater than X, actual RTT may be set to Y. On the other hand, when Y is set to be less than X, actual RTT may be set to X.
  B. Buffer dimensioning value: set to the smaller one of the nominal HARQ number X corresponding to the minimum RTT of the UE and a HARQ process number Y (set by, for example, the gNB)
  For example, when Y is set to be greater than X, the dimensioning value may be set to X. On the other end, when Y is set to be less than X, the dimensioning value may be set to Y.

[Scheme 3] UE Processing Time and HARQ Process Operation

In this scheme, a UE processing time, and corresponding HARQ timing and HARQ process-related operation method are proposed.

(1) UE Processing Time

First, the number of OFDM symbols corresponding to a time interval between a DL data reception (end) time and a corresponding HARQ-ACK transmission (start) time is defined as DL processing time N1. The number of OFDM symbols corresponding to a time interval between a UL grant reception (end) time and a corresponding UL data transmission (start) time is defined as UL processing time N2. For simplicity, in the following description, N1 and N2 are denoted by (N1, N2). (N1, N2) may represent N1 and N2 independently or refer to a pair of N1 and N2, depending on the context. That is, (N1, N2) may mean N1, N2 or N1/N2.

(N1, N2) may be set to different values depending on the SCS used for transmission of DL/UL data (and/or HARQ-ACK or UL grant), a DMRS mapping pattern (symbol position) configured for demodulation of a DL/UL data signal, an RE mapping method (e.g., a frequency-first or time-first manner) for the DL/UL data signal, and/or a ratio of the scheduled DL/UL data TBS to the peak data rate (i.e., TBS ratio).

For simplicity, the SCS, DMRS pattern, data mapping, TBS ratio, and the like are defined as (N1, N2)-impacting factors (simply, factors). Multiple candidates for one impacting factor (e.g., [for SCS] X (e.g., 15) kHz and Y (e.g., 30) kHz; [for DMRS pattern] a case where the last symbol index including DMRS is X and a case where the last symbol index is Y; [for data mapping] frequency-first mapping and time-first mapping; [for TBS ratio] X % and Y %, and so on) are defined as factor candidates (simply, candidates).

For candidates (A1, A2) of a specific factor A, (N1, N2) may have the same value (or be required to have the same value) for all UEs. On the other hand, for candidates (B1, B2) of another factor B, (N1, N2) may have different values for the respective UE. In this case, (N1, N2) for candidates (A1, A2) of factor A may be defined as a single fixed value and be designated as a mandatory item that all UEs should implement. On the other hand, (N1, N2) for candidates (B1, B2) of factor B may be designated as a capability item having different values for the respective UEs depending on implementation.

As another example, within the same factor A, (N1, N2) for candidate A1 may have the same value (or be required to have the same value) for all UEs, but (N1, N2) for candidate A2 may have different values for the respective UEs depending on the implementation. In this case, within the same factor A, (N1, N2) for candidate A1 may be defined as a single fixed value and designated as a mandatory item that all UEs should implement. On the other hand, (N1, N2) for candidate A2 may be designated as a capability item that has different values for the respective UEs depending on the implementation.

A data channel/signal and a control channel/signal corresponding to (N1, N 2) may be configured to be transmitted on the single CC or on different CCs (in the CA situation). In this case, different SCSs may be configured for the two different channels/signals. For example, in the case of N1, different SCSs may be used for DL data (e.g., PDSCH) and corresponding HARQ-ACK (e.g., PUCCH). In the case of N2, different SCSs may be used for UL grant DCI (e.g., PDCCH) and corresponding UL data (e.g., PUSCH).

Accordingly, when SCS S_d and SCS S_c are used for the data channel/signal and the control channel/signal, respectively, UE processing time (N1, N2) for the data/control combination may be determined to be: 1) (N1, N2) given when min (S_d, S_c), which is the value of the smaller one of data SCS S_d and control SCS S_c, is commonly used for data and control; 2) the greater one of (N1, N2) given when S_d is commonly used for data and control and (N1, N2) given when S_c is commonly used for data and control (in terms of absolute time); or 3) a×N_d+b×N_c, where the value of N given when S_d is commonly used for data and control is N_d and the value of N given when S_c is commonly used for data and control is N_c (wherein a+b=1 and, for example, a=b=0.5).

UCI (e.g., HARQ-ACK, CSI) may be transmitted on a UL data channel (e.g., PUSCH), not on a UL control channel (e.g., PUCCH) (after being multiplexed with the UL-SCH). To this end, the UE processing times (N1, N2, N3) may be defined as follows.

1) N1: the number of OFDM symbols corresponding to a time interval between a DL data (e.g., PDSCH) reception (end) time and a corresponding HARQ-ACK (e.g., PUCCH) transmission (start) time 2) N2: the number of OFDM symbols corresponding to a time interval between a UL grant (e.g., PDCCH) reception (end) time and a corresponding UL data (e.g., PUSCH) transmission (start) time 3) N3: the number of OFDM symbols corresponding to a time interval between a specific RS (e.g., CSI-RS) reception (end) time and a corresponding CSI feedback (e.g., PUCCH) transmission (start) time According to the definition above, the UE processing time N4 required when the UCI is piggybacked and transmitted on PUSCH may be determined based on a specific one of a processing time required for UCI transmission (on PUCCH) (Nu=N1 or N3) and a processing time N2 required for PUSCH transmission (without UCI) (e.g., N4=max(Nu, N2)+z), or may be determined to be N4=(a×Nu+b×N2)+z. Here, a+b=1, and, for example, a=b=0.5. z may be 0 or a positive integer (e.g., 1). In addition, the processing time N4 required when HARQ-ACK and CSI are piggybacked and transmitted on PUSCH simultaneously may be determined in a similar manner (e.g., N4=max(N1, N2, N3)+z or N4=(a×N1+b×N2+c×N3)+z). In addition, the processing time N5 required when HARQ-ACK and CSI are simultaneously transmitted on the same PUCCH may be determined in a similar manner (e.g., N5=max(N1, N3)+z or N5=(ax N1+b× N3)+z).

When different SCSs S_d and S_c are used for the PUSCH and the UCI PUCCH, the processing time N4 when the UCI is piggybacked and transmitted on the PUSCH may be determined to be: 1) N4 given when min(S_d, S_c), which is the similar one of the SCS S_d for the PUSCH and the SCS S_c for the PUCCH, is commonly used for the PUSCH and PUCCH; 2) the greater one of N4 given when S_d is commonly used for the PUSCH and PUCCH and N4 given when S_c is commonly used for the PUSCH and PUCCH (in terms of absolute time); or 3) a×N_d+b×N_c, where the value of N given when S_d is used for the PUSCH and PUCCH is N_d and the value of N given when S_c is used for the PUSCH and PUCCH is N_c (wherein a+b=1 and, for example, a=b=0.5). In addition, the processing time N4 required when HARQ-ACK and CSI are piggybacked and transmitted on PUSCH simultaneously may be determined in a similar manner, for example, as the minimum SCS, the maximum absolute time, or a combination of processing times, configured for the HARQ-ACK PUCCH, CSI PUCCH and PUSCH. In addition, the processing time N5 required when HARQ-ACK and CSI are simultaneously transmitted on the same PUCCH may be determined in a similar manner, for example, as the minimum SCS, the maximum absolute time, or a combination of processing times, configured for the HARQ-ACK PUCCH and CSI PUCCH.

The (minimum) HARQ timings (K1, K2) applied to the actual slot (index)-based signal transmission may be determined by adding a (propagation) delay and/or timing advance (TA) to the UE processing times (N1, N2). In this case, in order to determine (K1, K2), Opt 1) the TA value configured for each UE may be (UE-specifically) applied, or Opt 2) The maximum value that the TA may have may be (UE-commonly) applied.

Opt 1 and Opt 2 may be applied differently depending on situations and conditions. For example, Opt 2 may be applied to DL/UL data transmission (e.g., Msg3 PUSCH, Msg4 PDSCH) in the initial access or (contention-based) random access procedure. In this case, the processing time (N1, N2) may be set to the maximum value among the processing times that a UE can support. On the other hand, Opt 1 may be applied to DL/UL data transmission (e.g. unicast PDSCH/PUSCH) in the other situations (e.g., a situation after RRC connection). In this case, the processing time (N1, N2) may be set to a UE-specific processing time supported by a specific UE.

Different values of (K1, K2) may correspond to the respective candidates of a specific factor, and the HARQ RTT, max HARQ process number, and soft buffer dimensioning values may be determined based on the greatest value (or least value) among the different values of (K1, K2).

(2) HARQ Timing Configuration

A plurality of candidate HARQ timings (a set thereof) having the same value or more values based on (K1, K2) may be preconfigured through higher layer signaling (e.g., RRC signaling). In this case, the eNB may instruct the UE, through DL/UL grant DCI for scheduling DL/UL data, to use one HARQ timing of the plurality of candidate HARQ timings (in the set thereof) to perform actual signal transmission.

Specifically, the HARQ timing set may be configured differently (namely, composed of different HARQ timings) for the respective candidates of the following factors, including factors {SCS, DMRS pattern, data mapping, TBS ratio}. For example, HARQ timings with smaller/greater (delay) values may be configured for a candidate having a smaller/greater value of (N1, N2) or (K1, K2).

1) PDCCH duration

A. For example, when the symbol interval length and/or the last symbol position (index) at which the PDCCH (for UL grant) is transmitted is X and Y, B. A plurality of candidate symbol indexes (a set thereof) that may be designated as a start symbol on which the PUSCH (scheduled from the corresponding PDCCH) is mapped/transmitted (scheduled from) may be configured differently for each PDCCH duration.

2) PUCCH format

A. For example, when the first symbol position (index) and/or the symbol interval length at which the PUCCH (for HARQ-ACK) is transmitted is X and Y, B. A plurality of candidate timings (a set thereof) which may be designated by a delay value between PDSCH and HARQ-ACK (corresponding to HARQ-ACK transmission on a corresponding PUCCH) may be configured differently for each PUCCH format.

Alternatively, only one HARQ timing set may be configured for a specific factor, different timings applicable in the set may be configured for the respective candidates of the factor.

For example, for DMRS patterns 1 and 2 in which the index of the last symbol with DMRS in an SF/slot is set to X and Y (wherein X<Y), respectively, one HARQ timing set {T1, T2, T3, T4} may be configured (based on DMRS pattern 1 having the smaller value of N1 or K1) (wherein T1<T2<T3<T4). In this situation, for DMRS pattern 1, any timing of {T1, T2, T3, T4} is applicable. On the other hand, for DMRS pattern 2, only some specific timings (e.g., T3, T4) (having, for example, a greater delay value) may be configure to be applicable.

As another example, for TTIs 1 and 2 in which the maximum data duration or DCI detection period is set to N symbols and L symbols (wherein N>L), respectively, only one HARQ timing set {T1, T2, T3, T4} may be configured (based on scheduling TTI 1 having a greater value of N1 or K1) (wherein T1<T2<T3<T4). In this situation, all timing {T1, T2, T3, T4} may be applicable for TTI 1. On the other hand, for TTI 2, only some specific timings (e.g., T1, T2) (having, for example, a smaller delay value) may be configured to be applicable.

As another method, only one HARQ timing set may be configured for a specific factor, and timings obtained by adding a specific offset value to the timings constituting the set may be applied for a specific candidate.

For example, for DMRS patterns 1 and 2 in which the index of the last symbol with DMRS in an SF/slot is set to X and Y (wherein X<Y), respectively, one HARQ timing set {T1, T2, T3, T4} may be configured (based on DMRS pattern 1 having the smaller value of N1 or K1) (wherein T1<T2<T3<T4). In this situation, for DMRS pattern 1, {T1, T2, T3, T4} is applicable. On the other hand, for DMRS pattern 2, {T1+T0, T2+To, T3+To, T4+To} obtained by adding a specific offset To (e.g., a positive number) to the original timing set may be applied.

As another example, for TTIs 1 and 2 in which the maximum data duration or DCI detection period is set to N symbols and L symbols (wherein N>L), respectively, only one HARQ timing set {T1, T2, T3, T4} may be configured (based on scheduling TTI 1 having a greater value of N1 or K1) (wherein T1<T2<T3<T4). In this situation, all timing {T1, T2, T3, T4} may be applicable for TTI 1. On the other hand, for TTI 2, {T1+To, T2+To, T3+To, T4+To} obtained by adding a specific offset To (e.g., a narrative number) to the original timing set may be applied.

In the case of HARQ-ACK feedback transmission according to DL data reception, a plurality of candidate PUCCH resources/formats (a set thereof) may be preconfigured through higher layer signaling (e.g., RRC signaling). In this situation, the eNB may instruct the UE, through DL grant DCI for scheduling DL data, to use one specific PUCCH resource/format belonging to the PUCCH resource/format set for actual HARQ-ACK transmission. Here, the PUCCH resource/format set may be configured differently for the respective candidates of the factors (SCS, DMRS pattern, data mapping, TBS ratio, PDCCH interval) used for DL data transmission/scheduling. As an example, different PUCCH formats may be configured for the respective candidates of the factors. In addition, a PUCCH format configured with a smaller/larger interval (number of symbols) may be configured for a candidate having a smaller/greater value of N1 or K1.

(3) Soft Buffer Management

In the NR system, a plurality of CCs based on different RATs (e.g., NR, and LTE) may be configured for one UE in a manner of carrier aggregation (CA) or dual connectivity (DC) to enable multi-carrier operation.

In this situation, if a backhaul link between the RATs is non-ideally deployed, it may not be easy for the schedulers (e.g., eNB) responsible for the respective RATs to be tightly interworked in real time. In this case, the entire soft buffer of the UE may be semi-statically split and used for the RATs.

In this case, in order to ensure performance of DL data reception through the CCs belonging to each RAT with the buffer portions for the respective RATs split from the entire soft buffers, a lower limit is set to the minimum buffer size for each CC in each buffer portion.

For example, when the maximum number of CCs that may be set for the UE is K and the total soft buffer size is S, if the buffer size is split at a ratio of RAT1:RAT2=K1:K2 between RAT1 and RAT2, the buffer sizes allocated to the respective RATs and the buffer size allocated to one CC in each RAT may be configured as follows.

1) Buffer size for RAT1: S1=S×(K1/K)

A. Buffer size per CC in RAT1: C1=S1/min{N1, K1}

B. N1 denotes the number of CCs configured/set in RAT1 (by CA).

2) Buffer size for RAT2: S2=S×(K2/K)

A. Buffer size per CC in RAT2: C2=S2/min{N2, K2}

B. N2 denotes the number of CCs configured/set in RAT2 (by CA).

As another method, the entire soft buffer may be dynamically split or shared between the RATs (unlike the semi-static scheme described above). In this case, buffer portions for the respective RATs may be differently allocated within the entire buffer according to the difference or ratio between the maximum TBSs set for the respective RATs.

For example, when the ratio of the maximum TBSs for RAT1 and RAT2 is set to RAT1:RAT2=A:B (wherein, for example, A=1, B=1, or A+B=2), if N1 CCs and N2 CCs are configured/set for RAT1 and RAT2 (wherein N=N1+N2), the buffer sizes allocated to the respective RATs may be configured as follows.

1) Buffer size for RAT1: S1=S×A×(N1/N)
2) Buffer size for RAT2: S2=S×B×(N2/N)

Figure 22:
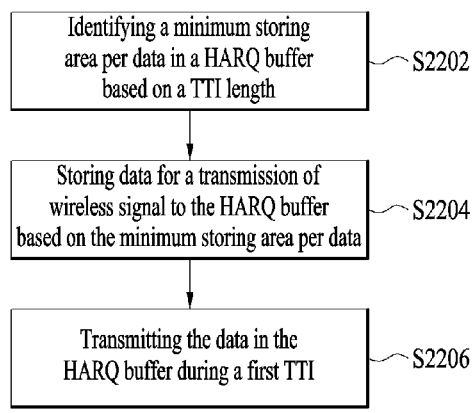

FIG. 22 illustrates transmission of a wireless signal in accordance with the present invention.

Referring to FIG. 22, the minimum storage space per data may be checked in a HARQ buffer (e.g., a soft buffer) based on a TTI length of a communication device (S2202), and data for transmission of the wireless signal may be stored in the HARQ buffer based on the minimum storage space per data (S2204). Thereafter, the communication device may transmit the data in the HARQ buffer for a first TTI (S2206). The communication device may be a UE or a BS.

When the data is retransmitted data, the minimum storage space per data may be based on a length of a second TTI used for initial transmission of the data, wherein the length of the second TTI may be different from the length of the first TTI.

Here, the minimum storage space per data may be checked by dividing the total space of the HARQ buffer by the number of HARQ processes corresponding to the TTI length. The minimum storage space per data may also be checked by dividing the entire space of the HARQ buffer into a plurality of sub-HARQ buffers according to the number of TTI lengths and then dividing each of the sub-HARQ buffers by the number of HARQ processes corresponding to a corresponding TTI length.

In addition, when the length of the first TTI is greater than the length of the second TTI, the minimum storage space per data based on the length of the first TTI may be checked by dividing the entire space of the HARQ buffer by the number of HARQ processes corresponding to the length of the first TTI, and the minimum storage space per data based on the length of the second TTI may be checked by dividing a partial space of the HARQ buffer by the number of HARQ processes corresponding to the length of the second TTI.

In addition, the communication device may have a plurality of CCs for different RATs aggregated, and the size of the HARQ buffer may be determined by the following equations according to the RATs used for transmission of the wireless signal:

$$\text{Buffer size for RAT1:} S*A*(N1/N)$$

$$\text{Buffer size for RAT2:} S*B*(N2/N)$$

Here, S denotes the total HARQ buffer size in the communication device, and A and B denote coefficients indicative of a ratio of the buffer sizes for RAT1 and RAT2. N1 denotes the number of CCs configured for RAT1, N2 denotes the number of CCs configured for RAT2, and N denotes the sum of N1 and N2.

In addition, a size of the TTI length may be given in the following order according to the service type: URLLC<eMBB<mMTC. In addition, the wireless communication system may include a 3GPP LTE-based wireless communication system, and the TTI length may be a multiple of a subframe or slot.

Figure 23:
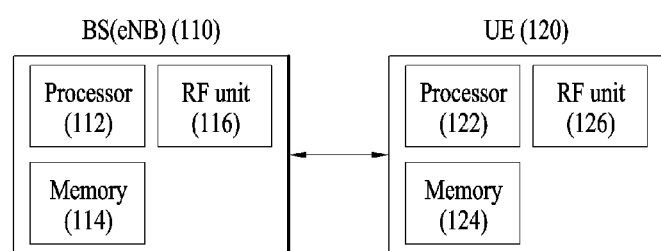
FIG. 23 illustrates a base station and user equipment applicable to an embodiment of the present invention.

FIG. 23 illustrates a BS and a UE of a wireless communication system, which are applicable to embodiments of the present invention.

Referring to FIG. 23, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

The invention claimed is:

1. A method for transmitting control information by a communication apparatus in a wireless communication system, the method comprising:
    receiving a Physical Downlink Shared Channel (PDSCH) based on a first Subcarrier Spacing (SCS); and
    transmitting a Hybrid Automatic Repeat and reQuest-Acknowledgement (HARQ-ACK) response for the PDSCH based on a second SCS,
    wherein a processing time required for the communication apparatus to process the PDSCH is determined based on a number of symbols, and
    wherein the number of symbols is determined based on one of the first SCS or the second SCS that makes the processing time largest in terms of absolute time.

2. The method of claim 1, wherein the first SCS is different from the second SCS.

3. The method of claim 1, wherein the symbols include Orthogonal Frequency Division Multiplexing (OFDM)-based symbols.

4. The method of claim 1, wherein only after the processing time from an end of a reception time of the PDSCH, the HARQ-ACK response can provide valid information for the PDSCH.

5. The method of claim 4, wherein the valid information for the PDSCH includes a decoding result of the PDSCH.

6. The method of claim 4, wherein a Timing Advance (TA) value is applied to the transmission of the HARQ-ACK response, and
    Wherein the valid information for the PDSCH can be provided only when the transmission of the HARQ-ACK response is started after the end of the reception time of the PDSCH.

7. The method of claim 4, wherein, before the processing time from the end of the reception time of the PDSCH, the HARQ-ACK response does not provide valid information for the PDSCH.

8. A communication apparatus configured to operate in a wireless communication system, the communication apparatus comprising:
    at least one processor; and
    at least one computer memory operably connectable to the at least one processor and storing instructions that, when executed by the at least one processor, perform operations comprising:
    receiving a Physical Downlink Shared Channel (PDSCH) based on a first Subcarrier Spacing (SCS); and
    transmitting a Hybrid Automatic Repeat and reQuest-Acknowledgement (HARQ-ACK) response for the PDSCH based on a second SCS,
    wherein a processing time required for the communication apparatus to process the PDSCH is determined based on a number of symbols, and
    wherein the number of symbols is determined based on one of the first SCS or the second SCS that makes the processing time largest in terms of absolute time.

9. The communication apparatus of claim 8, wherein the first SCS is different from the second SCS.

10. The communication apparatus of claim 8, wherein the symbols include Orthogonal Frequency Division Multiplexing (OFDM)-based symbols.

11. The communication apparatus of claim 8, wherein only after the processing time from an end of a reception time of the PDSCH, the HARQ-ACK response can provide valid information for the PDSCH.

12. The communication apparatus of claim 11, wherein the valid information for the PDSCH includes a decoding result of the PDSCH.

13. The communication apparatus of claim 11, wherein a Timing Advance (TA) value is applied to the transmission of the HARQ-ACK response, and
    wherein the valid information for the PDSCH can be provided only when the transmission of the HARQ-ACK response is started after the end of the reception time of the PDSCH.

14. The communication apparatus of claim 11, wherein, before the processing time from the end of the reception time of the PDSCH, the HARQ-ACK response does not provide valid information for the PDSCH.

15. The communication apparatus of claim 8, further comprising a radio frequency (RF) unit.

16. The communication apparatus of claim 8, wherein the communication apparatus is an autonomous vehicle that communicates with at least a mobile terminal, a network, or another autonomous vehicle other than the communication apparatus.

* * * * *